(12) United States Patent
Guo et al.

(10) Patent No.: US 10,916,135 B2
(45) Date of Patent: Feb. 9, 2021

(54) SIMILARITY LEARNING AND ASSOCIATION BETWEEN OBSERVATIONS OF MULTIPLE CONNECTED VEHICLES

(71) Applicant: TOYOTA JIDOSHA KABUSHIKI KAISHA, Toyota (JP)

(72) Inventors: Rui Guo, Mountain View, CA (US); Kentaro Oguchi, Menlo Park, CA (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 229 days.

(21) Appl. No.: 15/870,874

(22) Filed: Jan. 13, 2018

(65) Prior Publication Data

US 2019/0221121 A1 Jul. 18, 2019

(51) Int. Cl.
*G08G 1/0967* (2006.01)
*G08G 1/01* (2006.01)
(Continued)

(52) U.S. Cl.
CPC ....... *G08G 1/096791* (2013.01); *B60W 40/04* (2013.01); *G06K 9/00791* (2013.01);
(Continued)

(58) Field of Classification Search
CPC ............................................. G08G 1/096791
See application file for complete search history.

(56) References Cited

U.S. PATENT DOCUMENTS

| 7,974,748 B2 | 7/2011 | Goerick et al. |
| 8,213,706 B2 | 7/2012 | Krishnaswamy et al. |

(Continued)

FOREIGN PATENT DOCUMENTS

| JP | 2007-3568 | 1/2007 |
| JP | 2007122247 A | 5/2007 |

(Continued)

OTHER PUBLICATIONS

Fisher, "3×4 Projection Matrix," Apr. 16, 1997, retrieved from https://support.pix4d.com/hc/en-us/articles/202559089-How-are-the-Internal-and-External-Camera-Parameters-defined-#gsc.tab=0, 3 pgs.

(Continued)

*Primary Examiner* — Michael A Berns
(74) *Attorney, Agent, or Firm* — VLP Law Group, LLP; Michel Bohn

(57) ABSTRACT

In an example embodiment, a first vehicle platform includes a first sensor that has a first perspective directed toward an external environment and that captures first sensor data reflecting first objects, and a communication unit for receiving second sensor data from a second vehicle platform that reflects second objects included in the external environment. One or more computing devices extract a first set of multi-modal features from the first objects, and a second set of multi-modal features from the second objects in the second image, process the first set of multi-modal features and the second set of multi-modal features using separate machine learning logic to produce a first output and a second output, respectively, generate a similarity score using the first output and the second output; and associate the first and second perspectives using the similarity score.

23 Claims, 11 Drawing Sheets

(51) Int. Cl.
  *B60W 40/04* (2006.01)
  *H04W 4/46* (2018.01)
  *G08G 1/00* (2006.01)
  *G06K 9/00* (2006.01)
  *G06K 9/62* (2006.01)

(52) U.S. Cl.
  CPC ....... *G06K 9/00798* (2013.01); *G06K 9/6293* (2013.01); *G08G 1/0133* (2013.01); *G08G 1/20* (2013.01); *H04W 4/46* (2018.02); *B60W 2554/00* (2020.02); *B60W 2556/65* (2020.02)

(56) References Cited

U.S. PATENT DOCUMENTS

| | | | |
|---|---|---|---|
| 8,249,361 | B1 | 8/2012 | Steffens |
| 8,401,241 | B2 | 3/2013 | Chandraker et al. |
| 8,442,307 | B1 | 5/2013 | Anati et al. |
| 8,805,091 | B1 | 8/2014 | Hensel et al. |
| 8,948,455 | B2 | 2/2015 | Watanabe et al. |
| 8,970,357 | B2 | 3/2015 | Usami |
| 9,141,107 | B2 * | 9/2015 | Ferguson .............. B60W 10/20 |
| 9,148,650 | B2 | 9/2015 | Chandraker et al. |
| 9,300,947 | B2 | 3/2016 | Park et al. |
| 9,436,895 | B1 | 9/2016 | Jones et al. |
| 9,575,490 | B2 * | 2/2017 | Ferguson ............. B60W 30/143 |
| 9,805,276 | B2 * | 10/2017 | Pillai .................... B60W 40/08 |
| 9,911,198 | B2 * | 3/2018 | Pham ................. G06K 9/00771 |
| 9,979,813 | B2 | 5/2018 | Pandurangarao |
| 10,175,340 | B1 | 1/2019 | Abari et al. |
| 10,279,804 | B2 * | 5/2019 | Pal ........................ H04W 4/029 |
| 10,317,906 | B2 * | 6/2019 | Ferguson ............... G01C 21/32 |
| 10,445,576 | B2 * | 10/2019 | Ghata .................. G06K 9/00664 |
| 2008/0294401 | A1 | 11/2008 | Tsin et al. |
| 2013/0322692 | A1 | 12/2013 | Guan |
| 2014/0309833 | A1 | 10/2014 | Ferguson et al. |
| 2016/0026880 | A1 | 1/2016 | Lee et al. |
| 2016/0267331 | A1 | 9/2016 | Pillai et al. |
| 2017/0089710 | A1 | 3/2017 | Slusar |
| 2017/0132934 | A1 | 5/2017 | Kentley et al. |
| 2017/0178345 | A1 | 6/2017 | Pham |
| 2017/0286782 | A1 | 10/2017 | Pillai et al. |
| 2018/0018757 | A1 | 1/2018 | Suzuki |
| 2018/0046649 | A1 | 2/2018 | Dal Mutto et al. |
| 2018/0069937 | A1 | 3/2018 | Kolleri |
| 2018/0136000 | A1 * | 5/2018 | Rasmusson, Jr. .... G05D 1/0246 |
| 2018/0173953 | A1 | 6/2018 | Ghata |
| 2018/0203447 | A1 | 7/2018 | Wyffels |
| 2019/0065945 | A1 | 2/2019 | Luo et al. |
| 2019/0310648 | A1 * | 10/2019 | Yang .................... G05D 1/0221 |
| 2019/0384294 | A1 * | 12/2019 | Shashua ........... G08G 1/096805 |
| 2020/0012868 | A1 * | 1/2020 | Hong ................. G06K 9/00805 |

FOREIGN PATENT DOCUMENTS

| | | |
|---|---|---|
| JP | 2007206099 A | 8/2007 |
| WO | 2013/170882 | 11/2013 |

OTHER PUBLICATIONS

PIX4D, "How are the Internal and External Camera Parameters defined?" at least as early as Dec. 11, 2017, retrieved from http://homepages.inf.ed.ac.uk/rbf/CVonline/LOCAL_COPIES/EPSRC_SSAZ/node3.html, 3 pgs.

Welzel et al., "Accurate camera-based traffic sign localization," IEEE 17th International Conference on Intelligent Transportation Systems, Oct. 8-11, 2014, pp. 445-450.

Yu et al., "Monocular urban localization using street view," 14th International Conference on Control, Automation, Robotics and Vision (ICARCV), Nov. 13-15, 2016, published Jun. 16, 2016, 6 pgs.

"Machine Vision in World Coordinates," MVTec Software GmbH, Munchen Germany, 2003 (144 pages).

"Introduction to 3D Imaging: Perceiving 3D from 2D Images," retrieved from https://courses.cs.washington.edu/courses/cse576/06sp/notes/ (22 pages).

"Lecture 7: homogeneous coordinates," by Dr. Richard E. Turner, Oct. 31, 2013, retrieved from http://cbl.eng.cam.ac.uk/Public/Turner/Teaching (36 pages).

"Calibration and Projective Geometry (1)" Aaron Bobick, School of Interactive Computing, Fall 2013, retrieved from https://www.cc.gatech.edu/~afb/classes/CS4495-Fall2013/slides/CS4495-07-Calibration.pdf (48 pages).

"Camera Models and Parameters," Jul. 20, 2006, retrieved from http://ftp.cs.toronto.edu/pub/psala/VM (35 pages).

Chayati et al., "Tracking People by Detection Using CNN Features," Procedia Computer Science, vol. 124, Nov. 6-8, 2017, pp. 167-172.

Hadsell et al., "Dimensionality Reduction by Learning an Invariant Mapping," 2006 IEEE Computer Society Conference on Computer Vision and Pattern Recognition, New York, NY, USA, Jun. 17-22, 2006, IEEE, Piscataway, NJ, USA, vol. 2, pp. 1735-1742.

Nielsen, Michael A., "Chapter 1: Using neural nets to recognize handwritten digits," Neural Networks and Deep Learning, Determination Press, 2015, 54 pgs.

* cited by examiner

_US 10,916,135 B2_

SIMILARITY LEARNING AND ASSOCIATION BETWEEN OBSERVATIONS OF MULTIPLE CONNECTED VEHICLES

BACKGROUND

The present disclosure relates to learning representation of detected object. In a more particular example, the disclosure relates to technology for similarity learning and association between observations of multiple connected vehicles.

Object tracking and traffic situation localization often rely on multiple observations of the road scene that capture the same objects. However, it is challenging to identify the same objects included in these multiple observations. An existing solution for associating objects in multiple observations is to extract features of the objects and use feature comparison to match objects in different views. However, this existing approach generally only considers a limited number of predetermined features. As a result, the feature representations of the objects are often incomplete and cause inaccurate object association. On the other hand, using complete feature sets to describe the objects is also impractical because the complete feature sets cannot be efficiently transmitted through vehicular networks due to the latency and bandwidth limitation. In addition, the existing solutions are generally implemented in centralized systems and therefore, are typically inapplicable to distributed systems that include multiple collaborative vehicles in vehicular networks.

SUMMARY

The subject matter described in this disclosure overcomes the deficiencies and limitations of the existing solutions by providing novel technology for learning compact representation of detected objects and associating multiple observations from multiple vehicles.

According to one innovative aspect of the subject matter described in this disclosure, a computer-implemented method comprises: receiving two or more images captured by two or more vehicle platform sensors of two or more different vehicles platforms proximate a traffic situation; extracting a first set of multi-modal features from first objects in a first image of the two or more images, the first image associated with a first vehicle platform of the two or more vehicle platforms; extracting a second set of multi-modal features from second objects in a second image of the two or more images, the second image associated with a second vehicle platform of the two or more vehicle platforms; processing the first set of multi-modal features and the second set of multi-modal features using separate machine learning logic to produce a first output and a second output, respectively; generating a similarity score quantifying a difference between the first set of multi-modal features and the second set of multi-modal features using the first output and the second output; and associating, using the similarity score, a first observation of the traffic situation reflected by the first image associated with the first vehicle platform and a second observation of the traffic situation reflected by the second image associated with the second vehicle platform.

In general, another innovative aspect of the subject matter described in this disclosure may be embodied in system comprising a first vehicle platform and one or more computing devices. The first vehicle platform includes a first sensor having a first perspective directed toward an external environment external to the first vehicle platform. The first sensor captures first sensor data reflecting first objects included in the external environment. The first vehicle platform further includes a first communication unit for receiving second sensor data from a second vehicle platform. The second sensor data reflects second objects included in the external environment from a second perspective. The one or more computing devices, which may comprise a server, the first vehicle platform, the second vehicle platform, and/or another computing device coupled via a network, perform operations comprising: extracting a first set of multi-modal features from the first objects in the first sensor data; extracting a second set of multi-modal features from the second objects in the second sensor data; processing the first set of multi-modal features and the second set of multi-modal features using separate machine learning logic to produce a first output and a second output, respectively; generating a similarity score quantifying a difference between the first set of multi-modal features and the second set of multi-modal features using the first output and the second output; and associating, using the similarity score, the first perspective and the second perspective.

In general, another innovative aspect of the subject matter described in this disclosure may be embodied in systems comprising one or more processors including logic executable to perform operations comprising: receiving two or more images captured by two or more vehicle platform sensors of two or more different vehicles proximate a traffic situation; extracting a first set of multi-modal features from first objects in a first image of the two or more images, where the first image is associated with a first vehicle platform of the two or more vehicle platforms; extracting a second set of multi-modal features from second objects in a second image of the two or more images, where the second image is associated with a second vehicle platform of the two or more vehicle platforms; processing the first set of multi-modal features and the second set of multi-modal features using separate machine learning logic to produce a first output and a second output, respectively; generating a similarity score quantifying a difference between the first set of multi-modal features and the second set of multi-modal features using the first output and the second output; and associating, using the similarity score, a first observation of the traffic situation reflected by the first image associated with the first vehicle platform and a second observation of the traffic situation reflected by the second image associated with the second vehicle platform.

These and other implementations may each optionally include one or more of the following features: normalizing the first set of multi-modal features; normalizing the second set of multi-modal features; that combining the first set of multi-modal features includes combining the first set of normalized multi-modal features into a first multi-modal initial feature vector; that combining the second set of multi-modal features includes combining the second set of normalized multi-modal features into a second multi-modal initial feature vector; detecting the first objects in the first image of the two or more images; detecting the second objects in the second image of the two or more images; determining a first set of objects from the first objects of the first image to be driving-related; determining a second set of objects from the second objects of the second image to be driving related; combining the first set of multi-modal features into a first multi-modal feature vector; combining the second set of multi-modal features into a second multi-modal feature vector; that processing the first set of multi-modal features and the second set of multi-modal features includes processing the first multi-modal feature vector into a first compact feature vector and processing the second multi-modal feature vector into a second compact feature vector; that the first set of multi-modal features includes a texture feature, a color feature, a context feature, and a viewpoint feature of one or more of the first objects; that the second set of multi-modal features includes a texture feature, a color feature, a context feature, and a viewpoint feature of one or more of the second objects; that a predetermined target output indicates whether a first object in the first image and a second object in the second image represent a same object; that the separate machine learning logic includes a first machine learning logic and a second machine learning logic; that the first machine learning logic is a first subnetwork of a neural network and the second machine learning logic is a second subnetwork of the neural network; outputting information via an output device of the first vehicle platform based on the associating of the first observation of the traffic situation and the second observation on the traffic situation; updating, based on the association, dynamic mapping data reflecting a dynamic state of a roadway associated with the traffic situation; determining a location of another vehicle approaching the traffic situation based on the dynamic mapping data; sending notification data to the other vehicle platform approaching the traffic situation for output by an output device of the other vehicle platform; that the second vehicle platform includes a second sensor having the second perspective directed toward the external environment external to the second vehicle platform; that the second sensor captures the second sensor data reflecting first objects included in the external environment; that the second vehicle platform includes a second communication unit for sending the second sensor data from the second vehicle platform to the first vehicle platform; a hardware server embodied by at least one of the two or more computing devices; that the hardware server is adapted to train a machine learning model comprising the separate machine learning logic based on the similarity score; and that a first instance of the machine learning model is installed on the first vehicle platform and a second instance of the machine learning model is installed on the second vehicle platform.

Other implementations of one or more of these and other aspects include corresponding systems, apparatus, and computer programs, configured to perform the actions of methods, encoded on non-transitory computer storage devices.

The novel technology for distributable learning of compact representations of detected objects and associating multiple observations from multiple vehicles presented in this disclosure is particularly advantageous in a number of respects. For example, the technology described herein is capable of generating compact representations of detected objects in which the data amount for representing the objects is substantially reduced. Therefore, the compact representations of the objects can be efficiently transmitted over the vehicular network regardless of its inherent latency and bandwidth limitation. As a further example, the present technology can be deployed in a distributable manner, and thus, is suitable for implementation in individual collaborative vehicles of the vehicular network. Furthermore, the compact representations of the detected objects are selectively generated from a comprehensive set of features that describes the detected objects in various aspects (e.g., appearance, texture, color, viewpoint, etc.), thereby substantially improving the accuracy of similarity processing and observation association. The technology described herein can be used in various applications, e.g., object monitoring, three-dimensional (3D) modeling of road scene, traffic situation localization, etc.

Further non-limiting advantages and benefits are that a rich sets of multi-modality data are utilized, such as appearance coherence, geometry proximity, and viewpoint consistency, which helps to enforce the similarity property concurrently from the multi-view observations; association performance is improved; rather being limited to just learning how paired images correspond pixel-to-pixel, the technology described herein can model the high level similarity, which could be used to distinguish the observations are from the same object or not; the concurrent observations from multiple connected vehicles can be associated (e.g., in real or near real time); the system structure supports the real-time processing; offline training can be used for learning the similarity metrics and the learned models can be deployed on the vehicle platforms to evaluate the similarity for different categories of objects, thus reducing or eliminating the need for templates in some cases; the methods described herein are robust in different application scenarios; and the learned similarity metrics are generally invariant to illumination, pose, and viewpoint changes.

It should be understood that the foregoing advantages are provided by way of example and that the technology may have numerous other advantages and benefits.

The disclosure is illustrated by way of example, and not by way of limitation in the figures of the accompanying drawings in which like reference numerals are used to refer to similar elements.

DESCRIPTION

The technology described herein can learn the similarities between observations from multiple vehicles reflect different perspectives, and associate the observations to provide for enhanced object detection and/or classification, scene processing, and automated responses, such as notifications, automated vehicle maneuvering, enhanced navigation, peer-to-peer vehicle platform data transmission, etc. Observation association may refer to associating multiple images captured by various vehicles based on the similarity of detected objects included therein. As described in further detail below, the technology includes methods and corresponding systems that can learn to generate the compact representations determinatively describing the detected objects. Once the training process is completed, the components of the system, such as but not limited to the trained model, code, etc., can be distributed across multiple vehicles and/or computing entities to process the similarity between detected objects in multiple images and associate these images accordingly.

Figure 1:
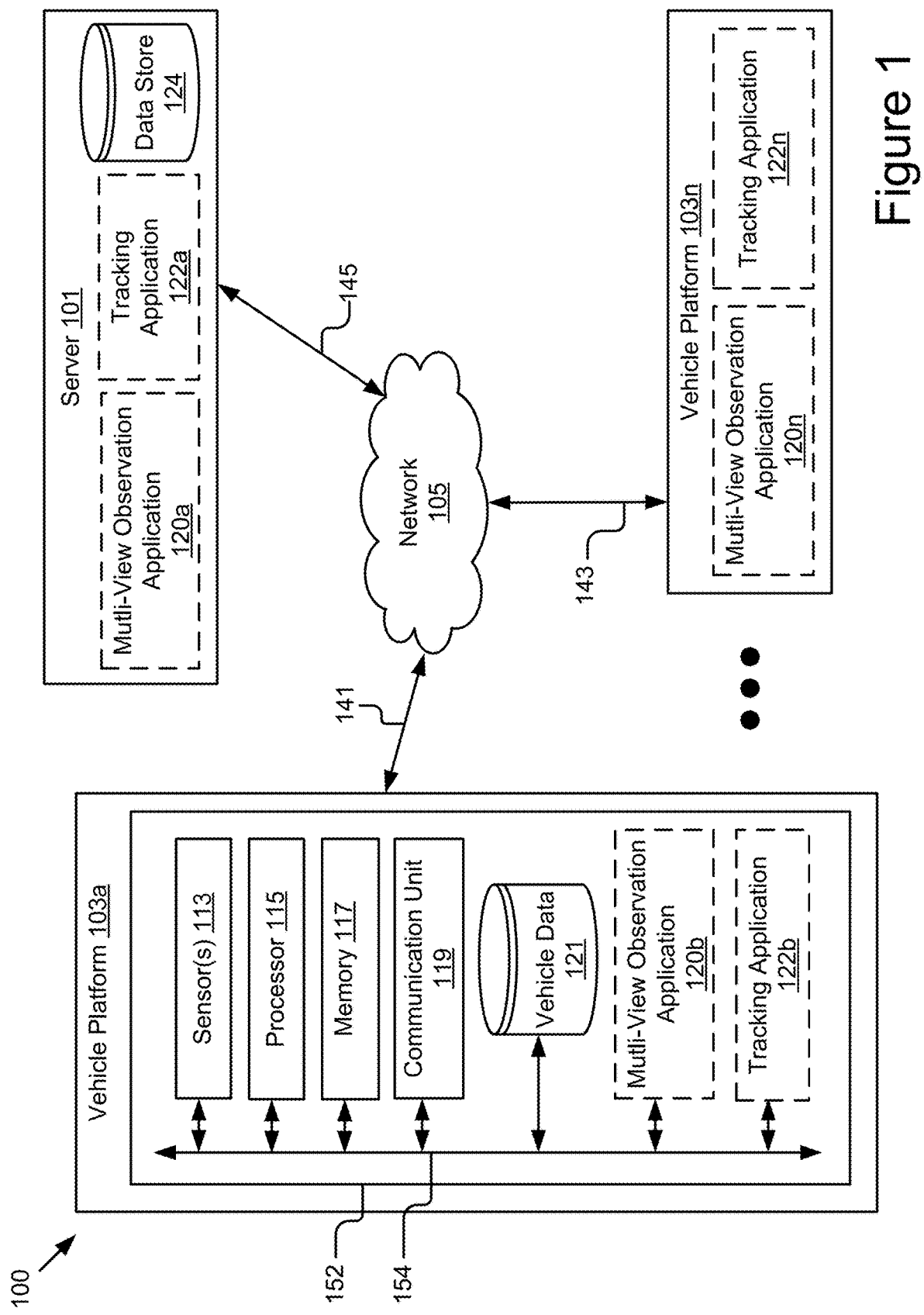
FIG. 1 is a block diagram of an example system for associating multiple observations from multiple vehicles.

FIG. 1 is a block diagram of an example system 100 for distributable learning of compact representation of detected objects and associating multiple observations from multiple vehicles. As shown, the system 100 includes a server 101 and one or more vehicle platforms 103a . . . 103n coupled for electronic communication via a network 105. In FIG. 1 and the remaining figures, a letter after a reference number, e.g., "103a," represents a reference to the element having that particular reference number. A reference number in the text without a following letter, e.g., "103," represents a general reference to instances of the element bearing that reference number. It should be understood that the system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of vehicle platforms 103, networks 105, or servers 101.

The network 105 may be a conventional type, wired and/or wireless, and may have numerous different configurations including a star configuration, token ring configuration, or other configurations. For example, the network 105 may include one or more local area networks (LAN), wide area networks (WAN) (e.g., the Internet), personal area networks (PAN), public networks, private networks, virtual networks, virtual private networks, peer-to-peer networks, near field networks (e.g., Bluetooth®, NFC, etc.), vehicular networks, and/or other interconnected data paths across which multiple devices may communicate.

The network 105 may also be coupled to or include portions of a telecommunications network for sending data in a variety of different communication protocols. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other suitable protocols. In some embodiments, the network 105 may be a wireless network using a connection such as DSRC (Dedicated Short Range Communication), WAVE, 802.11p, a 3G, 4G, 5G+ network, WiFi™, satellite networks, vehicle-to-vehicle (V2V) networks, vehicle-to-infrastructure/infrastructure-to-vehicle (V2I/I2V) networks, vehicle-to-infrastructure/vehicle-to-everything (V2I/V2X) networks, or any other wireless networks. In some embodiments, the network 105 may be a vehicular wireless networks having limited resources, e.g., limited communication bandwidth that may cause considerable transmission latency, etc. Although FIG. 1 illustrates a single block for the network 105 that couples to the server 101 and the vehicle platform(s) 103, it should be understood that the network 105 may in practice comprise any number of combination of networks, as noted above.

The vehicle platform(s) 103 include computing device(s) 152 having sensor(s) 113, processor(s) 115, memory(ies) 117, communication unit(s) 119, a vehicle data store 121, a multi-view observation application 120, and a tracking application 122. Examples of computing device(s) 152 may include virtual or physical computer processors, control units, micro-controllers, etc., which are coupled to other components of the vehicle platform(s) 103, such as one or more sensors 113, actuators, motivators, etc. The vehicle platform(s) 103 may be coupled to the network 105 via signal line 141, and may send and receive data to and from other vehicle platform(s) 103 and/or the server(s) 101. In some embodiments, the vehicle platform(s) 103 are capable of transporting from one point to another. Non-limiting examples of the vehicle platform(s) 103 include a vehicle, an automobile, a bus, a boat, a plane, a bionic implant, a robot, or any other platforms with non-transitory computer electronics (e.g., a processor, a memory or any combination of non-transitory computer electronics). The vehicle platform(s) 103 may be referred to herein as vehicle(s).

The processor(s) 115 may execute software instructions (e.g., tasks) by performing various input/output, logical, and/or mathematical operations. The processor(s) 115 may have various computing architectures to process data signals. The processor(s) 115 may be physical and/or virtual, and may include a single core or plurality of processing units and/or cores. In the context of the vehicle platform 103, the processor may be an electronic control unit (ECU) implemented in the vehicle platform 103 such as a car, although other types of platform are also possible and contemplated. The ECUs may receive and store the sensor data as vehicle operation data in the vehicle data store 121 for access and/or retrieval by the multi-view observation application 120. In some embodiments, the ECUs may implement models, machine learning logic(s) (e.g., software, code, etc.), that are trained to generate compact representations of detected objects. For example, the ECUs may deploy trained subnetwork(s) of the neural network to perform compact feature vector generation. In some implementations, the processor(s) 115 may be capable of generating and providing electronic display signals to input/output device(s), supporting the display of images, capturing and transmitting images, performing complex tasks including various types of object recognition and feature extraction, etc. In some implementations, the processor(s) 115 may be coupled to the memory(ies) 117 via the bus 154 to access data and instructions therefrom and store data therein. The bus 154 may couple the processor(s) 115 to the other components of the vehicle platform(s) 103 including, for example, the sensor(s) 113, the memory(ies) 117, the communication unit(s) 119, and/or and the vehicle data store 121.

The multi-view observation application 120 is computer logic executable to generate compact representations of detected objects in multiple images, determine the similarity between the detected objects using the compact representations, and associate the multiple images based on the determined similarity. As illustrated in FIG. 1, the server 101 and the vehicle platform 103a . . . 103n may include instances 120a and 120b . . . 120n of the multi-view observation application 120. In some embodiments, each instance 120a and 120b ... 120n may comprise one or more components the multi-view observation application 120 depicted in FIG. 2, and may be configured to fully or partially perform the functionalities described herein depending on where the instance resides. In some embodiments, the multi-view observation application 120 may be implemented using software executable by one or more processors of one or more computer devices, using hardware, such as but not limited to a field-programmable gate array (FPGA), an application-specific integrated circuit (ASIC), etc., and/or a combination of hardware and software, etc. The multi-view observation application 120 may receive and process the sensor data and/or the vehicle data, and communicate with other elements of the vehicle platform 103 via the bus 154, such as the memory 117, the communication unit 119, the vehicle data store 121, etc. The multi-view observation application 120 is described in details below with reference to at least FIGS. 2-9B.

The tracking application 122 is computer logic executable to perform object tracking over time. As illustrated in FIG. 1, the server 101 and/or the vehicle platform 103a ... 103n may include instances 122a and 122b ... 122n of the tracking application 122. In some embodiments, the tracking application 122 may be implemented using software executable by one or more processors of one or more computer devices, using hardware, such as but not limited to a field-programmable gate array (FPGA), an application-specific integrated circuit (ASIC), etc., and/or a combination of hardware and software, etc. In some embodiments, the tracking application 122 may perform object tracking to monitor various objects captured in multiple images based on the object similarity determined by the multi-view observation application 120. In some embodiments, the multi-view observation application 120 and the tracking application 122 may be incorporated into other applications (e.g., localization applications, navigation applications, 3D modeling applications, etc.) to provide accurate road scene analyses, thereby facilitating the functionalities of these other applications.

The memory(ies) 117 includes a non-transitory computer-usable (e.g., readable, writeable, etc.) medium, which can be any tangible non-transitory apparatus or device that can contain, store, communicate, propagate or transport instructions, data, computer programs, software, code, routines, etc., for processing by or in connection with the processor(s) 115. For example, the memory(ies) 117 may store the multi-view observation application 120 and/or the tracking application 122. In some implementations, the memory(ies) 117 may include one or more of volatile memory and non-volatile memory. For example, the memory(ies) 117 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory(ies) 117 may be a single device or may include multiple types of devices and configurations.

The communication unit 119 transmits data to and receives data from other computing devices to which it is communicatively coupled (e.g., via the network 105) using wireless and/or wired connections. The communication unit 119 may include one or more wired interfaces and/or wireless transceivers for sending and receiving data. The communication unit 119 may couple to the network 105 and communicate with other computing nodes, such as other vehicle platform(s) 103 and/or server(s) 101, etc. The communication unit 119 may exchange data with other computing nodes using standard communication methods, such as those discussed above.

The sensor(s) 113 includes any type of sensors suitable for the vehicle platform(s) 103. The sensor(s) 113 may be configured to collect any type of signal data suitable to determine characteristics of the vehicle platform 103 and/or its internal and external environments. Non-limiting examples of the sensor(s) 113 include various optical sensors (CCD, CMOS, 2D, 3D, light detection and ranging (LIDAR), cameras, etc.), audio sensors, motion detection sensors, barometers, altimeters, thermocouples, moisture sensors, infrared (IR) sensors, radar sensors, other photo sensors, gyroscopes, accelerometers, speedometers, steering sensors, braking sensors, switches, vehicle indicator sensors, windshield wiper sensors, geolocation sensors, orientation sensor, wireless transceivers (e.g., cellular, WiFi™, near-field, etc.), sonar sensors, ultrasonic sensors, touch sensors, proximity sensors, distance sensors, etc. In some embodiments, one or more sensors 113 may include externally facing sensors provided at the front side, rear side, right side, and/or left side of the vehicle platform 103 in order to capture the situational context surrounding the vehicle platform 103.

In some embodiments, the sensor(s) 113 may include one or more image sensors (e.g., optical sensors) configured to record images including video images and still images, may record frames of a video stream using any applicable frame rate, and may encode and/or process the video and still images captured using any applicable methods. In some embodiments, the image sensor(s) 113 can capture images of surrounding environments within their sensor range. For example, in the context of a vehicle platform, the image sensors 113 can capture the environment around the vehicle platform 103 including roads, buildings, roadside structures, static road objects (e.g., traffic cones, barricades, traffic signs, lanes, road markings, etc.), and/or dynamic road objects (e.g., vehicle platforms 103, pedestrians, bicycles, animals, etc.), etc. In some embodiments, the image sensors 113 may be mounted on the vehicle roof and/or inside the vehicle platform 103 to sense in any direction (forward, rearward, sideward, upward, downward facing, etc.) relative to the moving direction of the vehicle platform 103. In some embodiments, the image sensors 113 may be multidirectional (e.g., LIDAR). In some embodiments, the image sensors 113 installed on different vehicle platforms 103 may have different viewpoints and may be configured with different settings, installations, and/or configurations.

The vehicle data store 121 includes a non-transitory storage medium that stores various types of data. For example, the vehicle data store 121 may store vehicle data being communicated between different components of a given vehicle platform 103 using a bus, such as a controller area network (CAN) bus. In some embodiments, the vehicle data may include vehicle operation data collected from multiple sensors 113 coupled to different components of the vehicle platform 103 for monitoring operating states of these components, e.g., transmission, speed, acceleration, deceleration, wheel speed (Revolutions Per Minute—RPM), steering angle, braking force, etc. In some embodiments, the vehicle data may include moving direction, vehicle geolocation (e.g., GPS (Global Positioning System) coordinates) indicating geographic location of the vehicle platform 103, etc.

In some embodiments, the vehicle data may also include road scene images captured by one or more image sensors 113 of the vehicle platform 103 and the image data associated with these images. In some embodiments, the image data may include an image timestamp indicating date and time when the image is captured, the sensor position, and the sensor orientation of the image sensor 113, and/or other camera, camera position, vehicle platform sensor, CAN, etc., data when capturing the image. In some embodiments, the image data may also describe one or more objects detected in the image. For example, the image data may include modality feature(s), initial representation(s), and/or compact representation(s) of each detected objects in the image. The initial representation may be referred to herein as the initial feature representation of the detected object, and the compact representation may be referred to herein as the compact feature representation of the detected object.

In some embodiments, the modality features may include one or more features describing the detected object that may be useful in determining whether the detected objects in different images are actually the same. Examples of the modality features (also referred to herein simply as features) may include, but are not limited to, multi-scale texture features, color features, context features, viewpoint features, etc. Other modality features are also possible and contemplated. In some embodiments, the initial representation of the detected object may be an initial feature vector that comprehensively describes the detected object in various aspects with a rich set of modality features. In some embodiments, the compact representation of the detected may be a compact feature vector that describes the detected object with a fewer number of modality features than the corresponding initial feature vector. Therefore, the compact feature vector may have a lower feature dimension (and thus, is smaller in terms of data size) as compared to the corresponding initial feature vector.

In some embodiments, the vehicle data store 121 may store model data of a representation learning model (also referred to as simply a model). In some embodiments, the model may be a machine learning model being trained to generate the compact representations (e.g., compact feature vectors) that efficiently represent the detected objects and/or to determine the similarity of the detected objects using the compact representations. In some embodiments, the model may be implemented in the form of convolutional neural network, support vector machine, etc. Other system architectures for implementing machine learning models with various types of supervised learning algorithm and/or unsupervised learning algorithm are also possible and contemplated. In some embodiments, the model data may include one or more parameters of the model. For example, the model data may include mapping parameters of the machine learning logic learned from the training process for mapping the initial feature vector to the compact feature vector.

The server 101 includes a hardware and/or virtual server that includes a processor, a memory, and network communication capabilities (e.g., a communication unit). In some embodiments, the server 101 may have larger computing capabilities and computing resources than other entities of the system 100 (e.g., the vehicle platforms 103). The server 101 may be communicatively coupled to the network 105, as reflected by signal line 145. In some embodiments, the server may send and receive data to and from other entities of the system 100, e.g., one or more vehicle platforms 103. As depicted, the server 101 may include an instance of the multi-view observation application 120a and/or the tracking application 122a.

The server 101 may also include a data store 120 that stores various types of data for access and/or retrieval by these applications. For example, the data store 120 may store the compact representations (e.g., compact feature vectors) of detected objects received from the vehicle platform(s) 103, training data, model data of the representation learning model, etc. In some embodiments, the training data may include multiple groups of training images and the predetermined target output associated with each group of training images. In some embodiments, the predetermined target output may indicate whether the objects included in the group of training images represent the same object. For example, the training data may include positive training images with the predetermined target output="1" (indicating that objects included in the positive training images are the same), and negative training images with the predetermined target output="0" (indicating that objects included in the negative training images are not the same). In some embodiments, the model data may include parameters of the model at various points in the training process. For example, the model data may include mapping parameters of one or more machine learning logic being trained to generate compact feature vectors of detected objects, scoring parameters of one or more machine learning logic being trained to generate the similarity score, etc. In some embodiments, the model data may also include model configurations of the model. For example, the model configurations may define the convergence point indicating when the training process of the model is complete (e.g., a predetermined number of training cycles and/or a predetermined feedback difference are satisfied, etc.).

Other variations and/or combinations are also possible and contemplated. It should be understood that the system 100 illustrated in FIG. 1 is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

Figure 2:
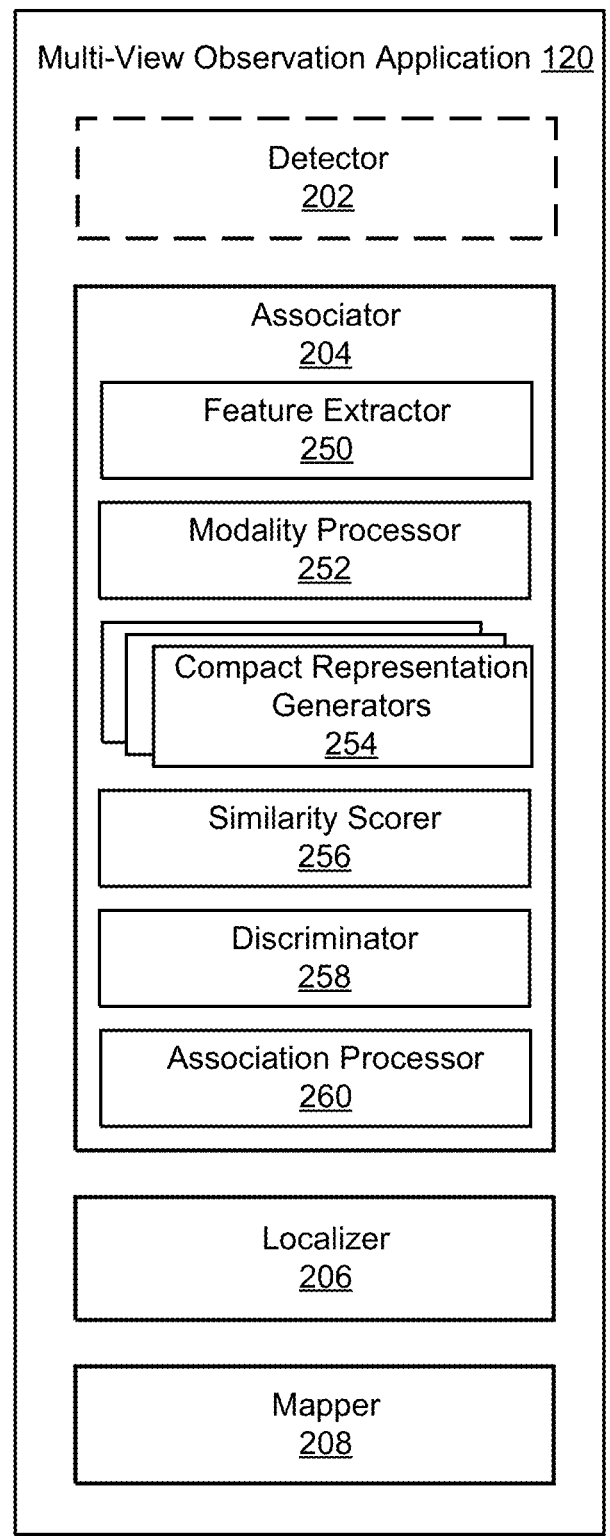
FIG. 2 is a block diagram of an example multi-view observation application.

FIG. 2 is a block diagram of an example multi-view observation application 120. As depicted, the multi-view observation application 120 may include a detector 202, an associator 204, a localizer 206, and a mapper 208. The associator 204 may include a feature extractor 250, a modality processor 252, a plurality of compact representation generators 254, a similarity scorer 256, a discriminator 258, and an association processor 260. It should be understood that the multi-view observation application 120 and/or the associator 204 may include additional components such as, but not limited to, a configuration engine, an encryption/decryption engine, etc., and/or these various components may be combined into a single engine or divided into additional engines.

The detector 202, the associator 204, the localizer 206, and the mapper 208 may be implemented as software, hardware, or a combination of the foregoing. In some embodiments, the detector 202, the associator 204, the localizer 206, and the mapper 208 may be communicatively coupled by the bus 154 and/or the processor 115 to one another and/or the other components of the computing device 152. Similarly, the feature extractor 250, the modality processor 252, the plurality of compact representation generators 254, the similarity scorer 256, the discriminator 258, and the association processor 260 included in the associator 204 may also be implemented as software, hardware, or a combination of the foregoing. In some embodiments, the feature extractor 250, the modality processor 252, the plurality of compact representation generators 254, the similarity scorer 256, the discriminator 258, and the association processor 260 may be communicatively coupled by the bus 154 and/or the processor 115 to one another, the other components of the multi-view observation application 120, and/or the other components of the computing device 152. In some embodiments, one or more of the components 103, 202, 204, 206, 208, and/or 250, 252, 254, 256, 258, 260 are sets of instructions executable by the processor 115 to provide their functionality. In further embodiments, one or more of the components 103, 202, 204, 206, 208, and/or 250, 252, 254, 256, 258, 260 are storable in the memory 117 and are accessible and executable by the processor 115 to provide their functionality. In any of the foregoing embodiments, these components 103, 202, 204, 206, 208, and/or 250, 252, 254, 256, 258, 260 may be adapted for cooperation and communication with the processor 115 and other components of the computing device 152.

The multi-view observation application 120, its components 202, 204, 206, 208, and the components 250, 252, 254, 256, 258, and 260 of the associator 204 are described in further detail below with reference to at least FIGS. 3-9B.

As discussed elsewhere herein, the multi-view observation application 120 is computer logic executable to associate multiple images captured by multiple vehicle platforms 103. In typical scenarios, multiple vehicle platforms 103 located in the same road area may capture multiple images of the same objects present in that road area from different perspectives. Therefore, in some embodiments, these multiple images may be associated by detecting objects in the images, determining the similarity between the detected objects, and associating the multiple images based on the determined object similarity.

In some embodiments, the multi-view observation application 120 may receive two or more images captured by two or more vehicle platform sensors of two or more different vehicles platforms proximate a traffic situation. The multi-view observation application 120 may extract a first set of multi-modal features from first objects in a first image of the two or more images. The first image may be associated with a first vehicle platform 103 of the two or more vehicle platforms 103. For example, a sensor of the first vehicle platform 103 may capture the image, and the sensor may be coupled to provide the image data comprising the image to the multi-view observation application 120, which may pair the image with one or more other images associated with the traffic situation, such as images captured by one or more other vehicle platforms 103 located within a geographic region of the traffic situation. For instance, the multi-view observation application 120 may also extract a second set of multi-modal features from second objects in a second image of the two or more images, the second image associated with a second vehicle platform 103 of the two or more vehicle platforms 103.

In some embodiments, the first vehicle platform, which may represent a computing device (e.g., via the ECU or other computational resources it may have), may include any of the elements discussed herein, such as a first sensor having a first perspective directed toward an external environment external to the first vehicle platform, where the first sensor captures first sensor data reflecting first objects included in the external environment; and a first communication unit for receiving second sensor data from a second vehicle platform, where the second sensor data reflecting second objects included in the external environment from a second perspective. In some embodiments, the second vehicle platform, which may represent a computing device (e.g., via the ECU or other computational resources it may have), similarly includes a second sensor having the second perspective directed toward the external environment external to the second vehicle platform, where the second sensor capturing the second sensor data reflecting first objects included in the external environment, and a second communication unit for sending the second sensor data from the second vehicle platform to the first vehicle platform.

In some embodiments, a hardware server embodied by at least one computing devices, the hardware server adapted to train a machine learning model comprising the separate machine learning logic based on the similarity score, wherein a first instance of the machine learning model is installed on the first vehicle platform and a second instance of the machine learning model is installed on the second vehicle platform.

In some embodiments, the multi-view observation application 120 may detect the first objects in the first image and the second objects in the second image, and so forth. The detection may in some cases occur via an instance of the application 120 operating on the respective vehicle platforms 103. Images that contain objects that are relevant to the movement and/or operation of the vehicle platform 103 (e.g., driving related) may be identified by the instance of the multi-view observation application 120 and then paired to form the paired input discussed elsewhere herein. For example, using the above example, the multi-view observation application 120 may determining a first set of objects from the first objects of the first image to be driving-related, and then determine a second set of objects from the second objects of the second image to be driving related, and so forth. These driving-related inputs (e.g., images, sets of sensor data, etc.) may then be paired (e.g., where a pair includes two or more inputs).

In some embodiments, in addition to determining objects in the images as being relevant for similarity learning, the multi-view observation application 120 may receive image-related data including geolocation data describing the geolocation where a given image was captured, and images may further be paired based on a corresponding area or region encompassing that geolocation (so that images capturing different perspectives of a roadway or traffic situation may be identified based on their geolocation data).

In some embodiments, the multi-view observation application 120 may process the first set of multi-modal features and the second set of multi-modal features using separate machine learning logic to produce a first output and a second output, respectively, as discussed further elsewhere herein. In some cases, the first and second set of multi-modal features (up to N sets depending on how many images are being concurrently processed), may be normalized and combined. For instance, in the above example involving the first and second images, the first and second set of multi-modal features may be independently normalized and then combined into respective multi-modal initial feature vectors (e.g., first vector, second vector, etc.).

Responsive to the processing, the multi-view observation application 120 may generate a similarity score quantifying a difference between the first set of multi-modal features and the second set of multi-modal features using the first output and the second output. Using the similarity score, the multi-view observation application 120 may associate a first observation of the traffic situation reflected by the first image associated with the first vehicle platform 103 and a second observation of the traffic situation reflected by the second image associated with the second vehicle platform 103, as discussed elsewhere herein. In some embodiments, such image association may be performed using the compact feature representations of objects detected in the images. These compact feature representations may discriminatively describe the detected objects, while can still be efficiently transmitted over the vehicular network regardless of the latency and bandwidth limitation.

Continuing the above example, in some embodiments, the multi-view observation application 120 may output information via an output device of the first vehicle platform 103 based on the associating of the first observation of the traffic situation and the second observation on the traffic situation. For example, a vehicle platform may include output device(s) coupled to the bus which may comprise any devices configured to output or display information to a user or other devices, such as, but not limited to, a touch screen for displaying notifications, navigation information, multimedia information, settings, etc., an audio reproduction device (e.g., speaker) for delivering sound information, a display/monitor for presenting texting or graphical information to the user, etc. The outputting information may be text, graphic, tactile, audio, video, and other information that may be understood by the driver and/or passengers or the other devices, or may be data, logic, programming that can be readable by the operating system of the vehicle platform 103 and/or other computing devices. The output device(s) may be coupled to other components of the vehicle platform 103 directly or through intervening controllers. In some implementations, a set of output device(s) 221 may be included in or form a control panel that a person may interact with to adjust settings and/or control of a vehicle platform 103 (e.g., driver controls, infotainment controls, guidance controls, safety controls, etc.).

In some embodiments, a navigation application operating on a vehicle platform 103, such as the first or second vehicle platforms in the above examples, may present dynamic information showing the object(s) involved in the traffic situation and/or changes to the dynamic state of the traffic situation. This advantageous as a traffic situation is often dynamic and/or semi-dynamic/static and likely to change over time (minutes, hours, days, etc.). Further, various objects forming the traffic situation may appear differently from different angles and distances due the factors discussed herein, and the processing by the multi-view observation application 120 may account for that as multiple perspective of a given geographical area can be captured and processed to reliably determine the types and identities of the objects in that area. These determinations can then be used to classify the area into a traffic situation or scene and used to produce output relevant to the vehicle platforms 103 in or approaching the area. Additionally, all of the forgoing output, along with the geolocation data, may be stored in a dynamic mapping data database reflect a dynamic map of any areas in which data available (where in practical terms that can may any roadways that are traveled by the vehicle platforms 103. Timestamp data for the observations may also be stored so the traffic conditions and changes to the traffic conditions can be monitored, predicted, and detected in real or near real time (e.g., due to latency, data lag, etc.), and used to generate navigation routes, route suggestions, alerts, and other information that can be displayed to users of the vehicle platforms 103.

Figure 3:
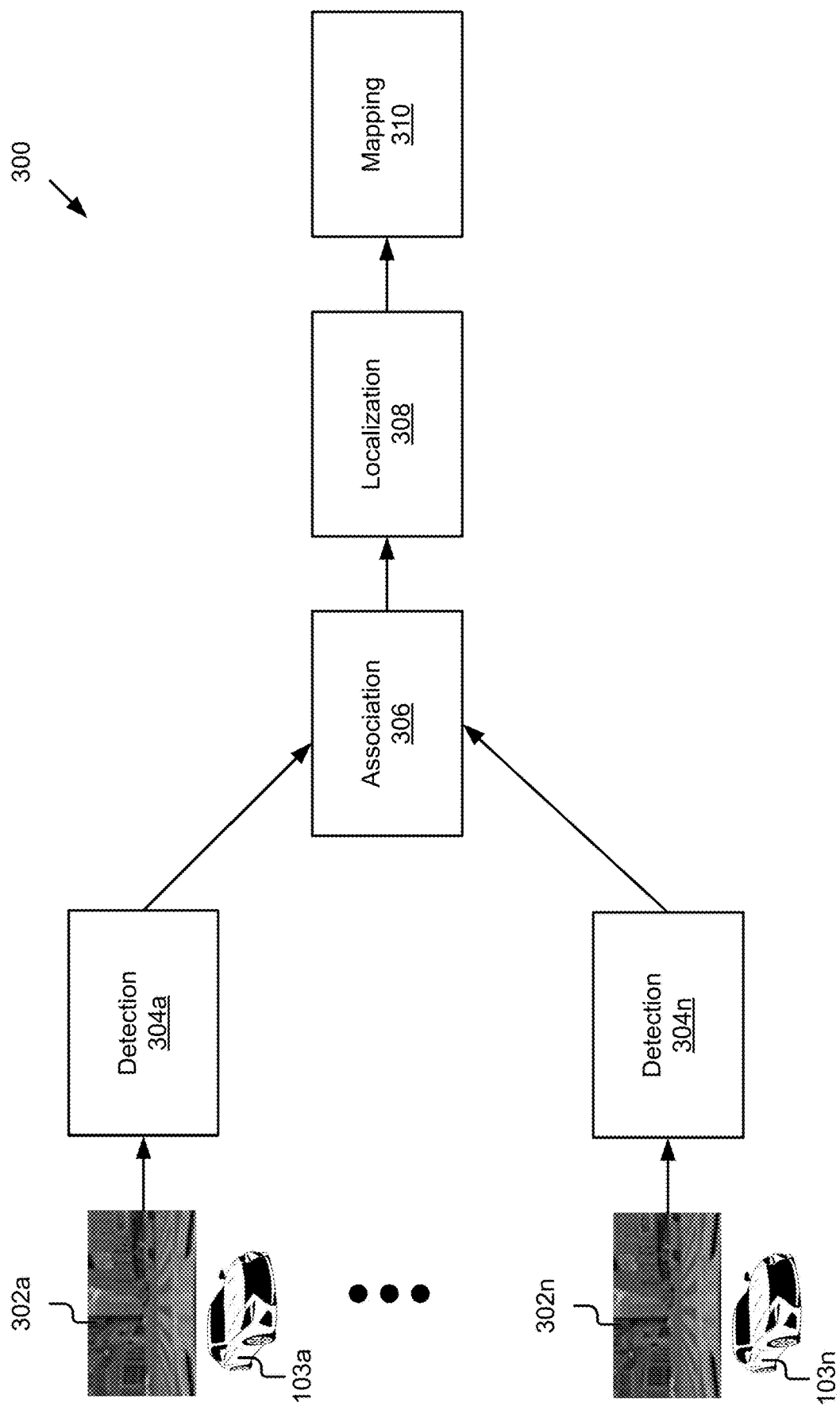
FIG. 3 is a flowchart of an example method for dynamically positioning objects on geographical map.

In some embodiments, the functionalities performed by the multi-view observation application 120 may be used in dynamically positioning objects on the geographical map. FIG. 3 is a flowchart of an example method 300 for dynamically positioning objects on the geographical map. In block 302, the image sensor 113 of the vehicle platform 103 may capture images of the road scene. In block 304, the detector 202 may detect one or more objects in the captured images. As depicted in FIG. 3, the image capture and object detection may be performed in multiple individual vehicle platforms 103.

In block 306, the associator 204 may associate the images captured from different perspectives by multiple vehicle platforms 103. For example, the associator 204 may determine the similarity between the objects detected in the captured images and associate the captured images based on the object similarity. In some embodiments, the images being associated with each other may include the same detected object(s). In block 308, the localizer 206 may localize the detected objects. For example, the localizer 206 may apply visual processing on the associated images including the same detected objects to calculate the geolocation (e.g., GPS coordinates) of the detected objects. In block 310, the mapper 208 may project the detected objects on geographical map based on their determined locations. For example, the detected objects may be positioned on the geographical map using their geolocation coordinates. The mapper 208 may also update the geographical map as the locations of the detected objects change over time.

Figure 4A:
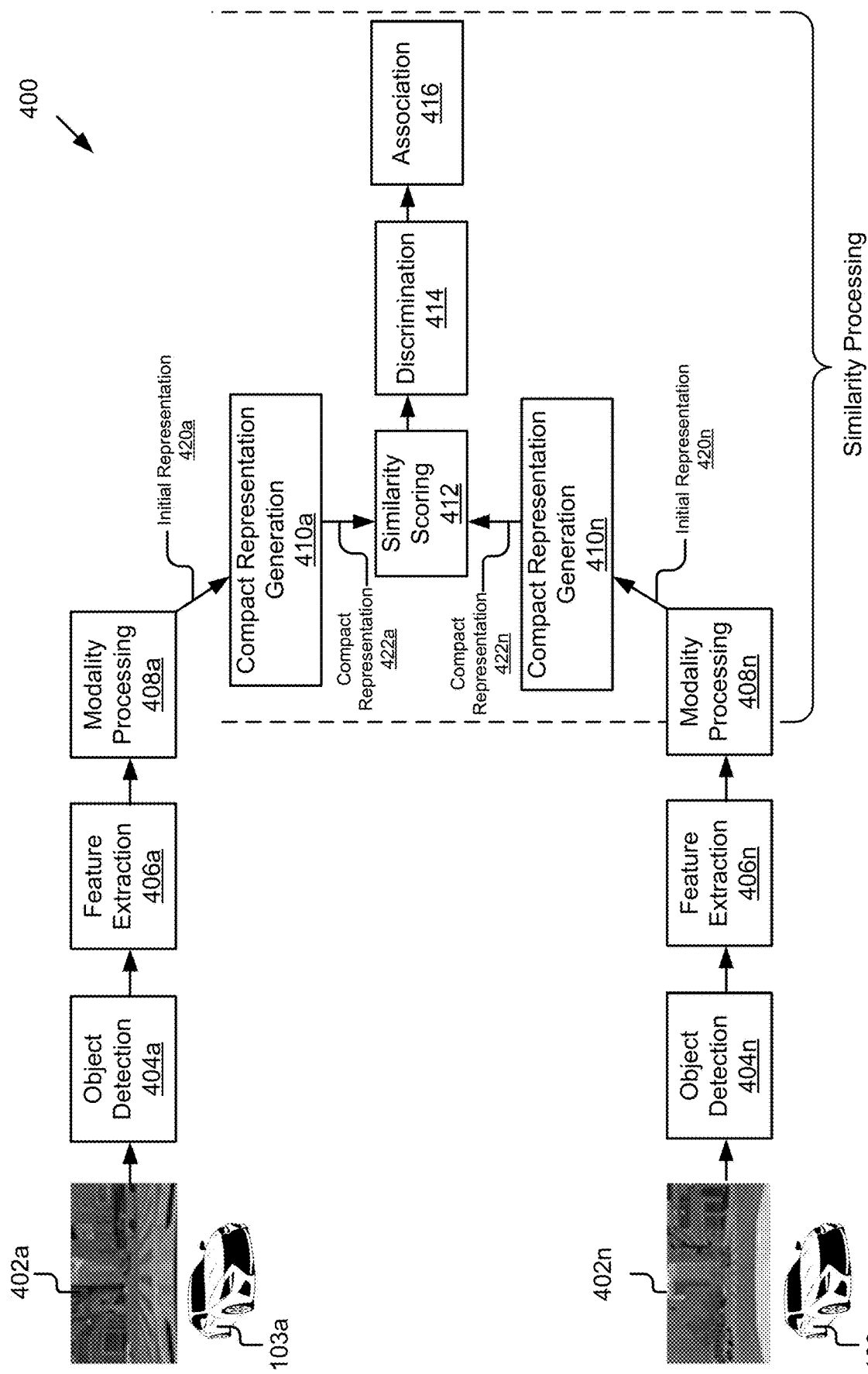
FIG. 4A is a flowchart of an example method for learning compact representation of detected objects and associating multiple observations from multiple vehicles.

FIG. 4A is a flowchart of an example method 400 for learning compact representation of detected objects included in multiple images and associating the multiple images received from multiple vehicles. In block 402, the image sensor 113 of the vehicle platform 103 may capture images of the road scene as the vehicle platform 103 travels along the road. In some embodiments, these road scene images may be captured at a predefined rate/interval (e.g., every 5 seconds, 10 seconds, 30 seconds, etc.). In block 404, the detector 202 may detect one or more objects in the captured images. For example, the detector 202 may perform object recognition on a captured image (e.g., using vision algorithm) to detect one or more objects present in the road scene. In block 406, the feature extractor 250 may extract features of the detected objects. For example, the feature extractor 250 may process the captured image to determine one or more modality features describing each detected object in the image.

Figure 8:
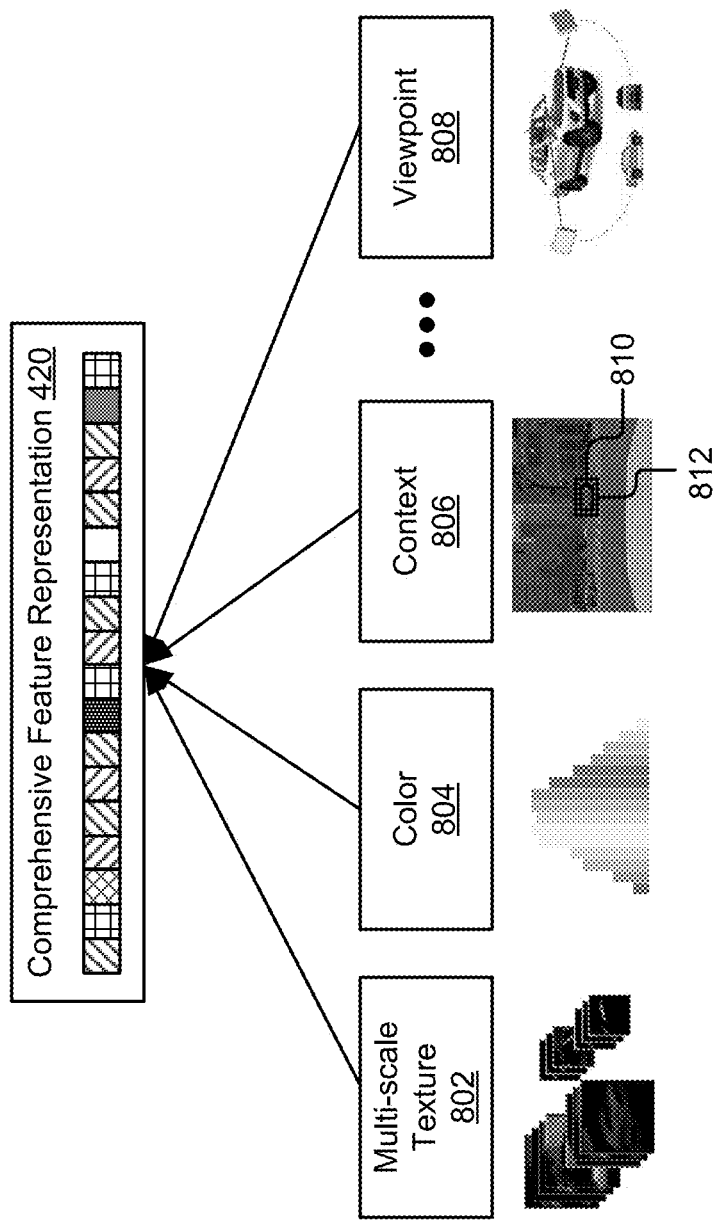
FIG. 8 is a flowchart of an example method for extracting modality features describing a detected object.

FIG. 8 is a flowchart of an example method 800 for extracting modality features describing a detected object. In block 802, the feature extractor 250 may process the image data to determine one or more texture features of the detected object. In some embodiments, the texture features may describe the texture (e.g., geometric shape, structure, textural pattern, etc.) of various portions of the detected object (e.g., hood, wheel, bumper, etc.). The texture of different portions may be at different scales. In block 804, the feature extractor 250 may determine one or more color features of the detected object. For example, the feature extractor 250 may determine that the car parking at the curb is black, the pedestrian crossing the road is wearing a blue dress and carrying a pink umbrella, etc.

In block 806, the feature extractor 250 may determine one or more context features of the detected object. In some embodiments, the context features may describe the background environment around the detected objects. In some embodiments, for each first bounding box indicating a detected object in the image, the feature extractor 250 may process an image region within a second bounding box surrounding the first bounding box to determine the background context associated with the detected object. In some embodiments, the second bounding box may have a predetermined shape and size. For example, as depicted in FIG. 8, for the detected vehicle indicated by the bounding box 810 in the image, the feature extractor 250 may process the image region in the bounding box 812. In this example, the bounding box 812 may have the same rectangular shape as the bounding box 810 and cover an additional image region of 20% around the bounding box 810. The feature extractor 250 may process the image data in the bounding box 812 and determine that the detected vehicle is driving parallel to a zebra crosswalk, and thus determine that the detected vehicle is driving through an intersection.

The context features are useful in similarity processing especially when the captured images include objects with identical appearance. As an example, a first image may include a first car having the same appearance as a second car in a second image. The context features associated with the first car may indicate that the first car is driving on the road while the context features associated with the second car may indicate that the second car is parked in front of a building. Accordingly, although the first car and the second car may look exactly the same, the first car and the second car may be determined as not representing the same object because their surrounding environments as indicated by the context features are different.

In block 808, the feature extractor 250 may determine one or more viewpoint features of the detected object. The viewpoint features may indicate the perspective from which the image including the detected object is captured. In some embodiments, the viewpoint features may include the moving direction of the vehicle platform 103, and the sensor position and the sensor orientation of the image sensor 113 when capturing the image including the detected objects. In some embodiments, the feature extractor 250 may retrieve the moving direction of the vehicle platform 103 from the vehicle data using the image timestamp. The feature extractor 250 may retrieve the sensor position and the sensor orientation of the image sensor 113 from the image data associated with the image in the vehicle data store 121. As an example, the feature extractor 250 may determine that the vehicle platform 103 is moving in the north direction, and the image sensor 113 is provided at the front side of the vehicle platform 103 with the sensor orientation of 275/360° when capturing the image including the detected objects.

Using the viewpoint features is particularly advantageous in similarity processing. As an example, a first image may include a first damaged truck similar to a second damaged truck in a second image. The feature extractor 250 may determine that the first image is captured by the image sensor provided on the left side of the first vehicle platform 103 moving in the north direction, and the second image is captured by the image sensor provided on the left side of the second vehicle platform 103 moving in the south direction. Accordingly, the first damaged truck and the second damaged truck may be determined as representing the same object because the perspectives from which they are captured as indicated by the viewpoint features are compatible.

Referring back to FIG. 4, in block 408, the modality processor 252 may process the modality features describing the detected objects in the image. In some embodiments, the modality processor 252 may normalize and concatenate the modality features to generate an initial representation 420 of the detected object. In particular, the modality features describing the detected object may be converted and/or reorganized to conform to predefined standards. The modality processor 252 may then aggregate the normalized modality features into an initial feature vector that comprehensively describes the detected object. In some embodiments, the initial feature vector of the detected object may include a complete set of modality features with the texture feature(s), the color feature(s), the context feature(s), the viewpoint feature(s), etc. associated with the detected object. As a result, the initial feature vector of the detected object may have a large feature dimension (and thus, large data size) corresponding to the large number of modality features included therein.

In block 410, the compact representation generator 254 may generate the compact representation of the detected object. In particular, the compact representation generator 254 may map the initial representation 420 of the detected object to the compact representation 422 of the detected object. For example, the compact representation generator 254 may map the initial feature vector representing the detected object to a compact feature vector representing the detected object. In some embodiments, the compact feature vector may comprise a fewer number of modality features (and thus, having a lower feature dimension and smaller data size) as compared to the corresponding initial feature vector.

As depicted in FIG. 4A, the image capture, the object detection, the feature extraction, the modality processing, and the compact representation generation may be performed in multiple individual vehicle platforms 103 to generate the compact representations 422 of the detected objects in multiple images captured from different perspectives. As discussed elsewhere herein, the compact representations 422 of the detected objects in these captured images may conform to predefined standards, and therefore may have the same format and feature dimension. In some embodiments, the compact representations 422 of the detected objects in the captured images may be input into the similarity scorer 256. In block 412, the similarity scorer 256 may compute a similarity score reflecting the level of similarity between the compact representations 422 of detected objects in different captured images. As an example, the similarity scorer 256 may compute a similarity score indicating the level of similarity between a first compact representation 422a (e.g., a first compact feature vector) of a first object in a first image captured from a first perspective and an $n^{th}$ compact representation 422n (e.g., an $n^{th}$ compact feature vector) of a second object in a second image captured from a second perspective.

In some embodiments, the compact representation generation performed by the compact representation generator 254 and the similarity score computation performed by the similarity scorer 256 may be used in processing object similarity and may be implemented as a representation learning model. As discussed elsewhere herein, the model may be a trained to generate the compact representations that efficiently represent the detected objects from the initial representations of the detected objects, and determine the similarity of the detected objects using the generated compact representations.

In some embodiments, the trained model may be implemented as software, hardware, a combination of the forgoing, etc., in vehicle platforms 103 (e.g., installed, built, updated to include, stored in memory and executed, etc.) and used during real-time driving to detect and classify objects, process scenes, sharing object and/or scene information with nearby vehicle platforms 103, provide driver and passenger feedback via output devices of the vehicle platforms 103, transmit data to the server 101 for storage in a dynamic map shared across a multiplicity of vehicles forming a traffic ecosystem, used for route computation and navigation instruction provision via navigation applications (e.g., GPS or other geopositioning systems) included in and executed by the vehicle platform, etc. In some embodiments, the machine learning logic(s) embodied by a plurality of the compact representation generators 254a . . . 254n and the similarity scorer 256 may be executed to perform the operations discussed herein.

Figure 5:
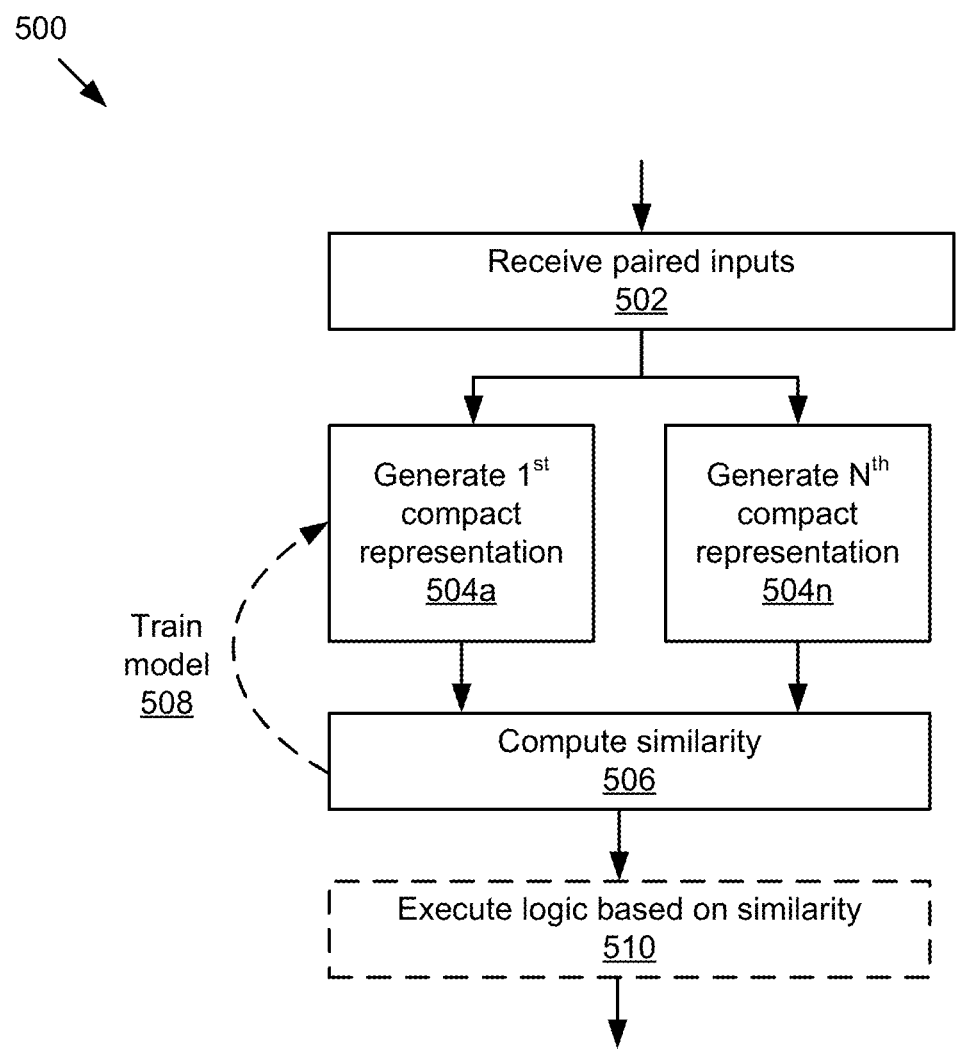
FIG. 5 is a flowchart of an example method for processing similarity between detected objects.

FIG. 5 is a flowchart of an example method 500 for processing similarity between detected objects. In block 502, the compact representation generators 254 may receive paired inputs. In some embodiments, the paired input may include a plurality of initial representations of detected objects in multiple images. Each initial representation of a detected object may be input into one compact representation generator 254. For example, the paired inputs may include a first initial representation 420a (e.g., a first initial feature vector) of the first object in the first image and an $n^{th}$ initial representation 420n (e.g., an $n^{th}$ initial feature vector) of the second object in the second image. The first initial representation 420a may be input into the compact representation generator 254a and the $n^{th}$ initial representation 420n may be input into the compact representation generator 254n. As discussed elsewhere herein, the first initial representation 420a may comprehensively describe the first object and the $n^{th}$ initial representation 420n may comprehensively describe the second object with two corresponding complete sets of modality features. However, not all these modality features are useful for determining whether the first object in the first image and the second object in the second image are actually the same. Therefore, the model implemented by the compact representation generators 254 and the similarity scorer 256 may be trained to identify which modality features are critical for processing object similarity in particular scenarios, which modality features are unimportant and thus, can be disregarded without affecting the accuracy of object similarity processing. Accordingly, the compact representation generators 254 may filter out those unimportant modality features when mapping the initial feature vectors 420 to the compact feature vectors 422, thereby substantially reduce the data amount required to efficiently and discriminatively represent the detected objects.

In block 504a, the compact representation generator 254a may generate the first compact representation 422a of the first object in the first image from the first initial representation 420a of the first object. In block 504n, the compact representation generator 254n may generate the $n^{th}$ compact representation 422n of the second object in the second image from the $n^{th}$ initial representation 420n of the second object. In block 506, the similarity scorer 256 may compute the level of similarity between the first object in the first image and the second object in the second image. In particular, the similarity scorer 256 may compute the similarity score between the first compact representation 422a of the first object in the first image and the $n^{th}$ compact representation 422n of the second object in the second image. In some embodiments, during the training process of the model, the similarity scorer 256 may also compute the feedback difference between the similarity score and the predetermined target output. In block 508, the similarity scorer 256 may provide the feedback difference to the compact representation generators 254a . . . 254n to train the model.

In some embodiments, during the deployment process of the model (e.g., once the training process of the representation learning model is complete), in block 510, other components of the multi-view observation application 120 may execute logics based on the level of similarity between the first object in the first image and the second object in the second image. For example, the level of similarity may be used to determine whether the first object in the first image and the second object in the second image represent the same object. If the first object in the first image and the second object in the second image are actually the same object, the first image and the second image may be associated with each other and may be used in combination to analyze the related road scene.

In some embodiments, the model may be continuously trained over time. In these embodiments, even during the deployment process of the model, the similarity scorer 256 may still compute and back-propagate the feedback difference to the compact representation generators 254a . . . 254n to continue training the model. This implementation is particularly advantageous, because it continuously improves the model with additional images of the road scenes encountered by the vehicle platforms 103 as the vehicle platforms 103 travel along the roads. As a result, the parameters of the model (e.g., the mapping parameters for generating the compact representation of detected objects, the scoring parameters for processing object similarity, etc.) can be further refined for better performance.

Figure 6:
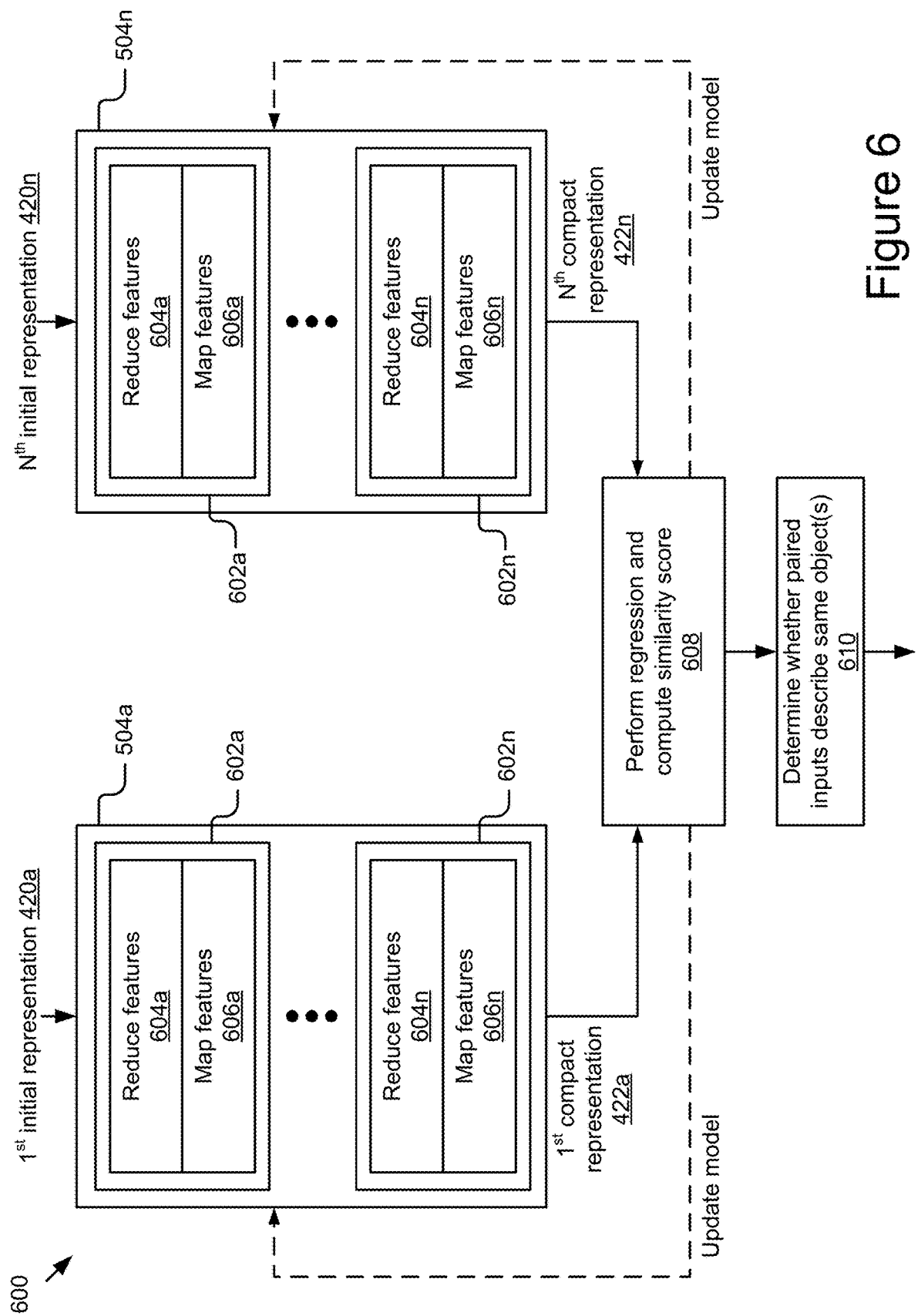
FIG. 6 is a flowchart of another example method for processing similarity between detected objects.

FIG. 6 is a flowchart of another example method 600 for processing similarity between detected objects. As depicted, the first initial representation 420a of the first object in the first image captured from the first perspective is input into the compact representation generator 254a. The $n^{th}$ initial representation 420n of the second object in the second image captured from the second perspective is input into the compact representation generator 254n. In some embodiments, the first initial representation 420a may be a first initial feature vector 420a describing the first object in the first image and including a first number of modality features. The $n^{th}$ initial representation 420n may be an $n^{th}$ initial feature vector 420n describing the second object in the second image and including a second number of modality features.

In block 504a, the compact representation generator 254a may map the first initial representation 420a of the first object in the first image to the first compact representation 422a of the first object in the first image. In particular, the compact representation generator 254a may map the first initial feature vector 420a of the first object to the first compact feature vector 422a of the first object. In some embodiments, the compact representation generator 254a may filter out one or more modality features from the first number of modality features included in the first initial feature vector 420a of the first object, thereby projecting the first initial feature vector 420a from the input vector space having the feature dimension=the first number of modality features to a latent vector space having a lower feature dimension. Similarly, the compact representation generator 254n may map the $n^{th}$ initial representation 420n of the second object to the $n^{th}$ compact representation 422n of the second object. In particular, the compact representation generator 254n may filter out one or more modality features from the second number of modality features included in the $n^{th}$ initial feature vector 420n of the second object, thereby projecting the $n^{th}$ initial feature vector 420n from the input vector space having the feature dimension=the second number of modality features to the latent vector space having the lower feature dimension. As discussed elsewhere herein, in some embodiments, the first initial feature vector 420a of the first object and the $n^{th}$ initial feature vector 420n of the second object may have the same format and feature dimension. Therefore, the first number of modality features included in the first initial feature vector 420a of the first object may equal to the second number of modality features included in the $n^{th}$ initial feature vector 420n of the second object.

In some embodiments, the parameters of the compact representation generator 254a may be identical to the parameters of the compact representation generator 254n. In these embodiments, each compact representation generator 254a . . . 254n may operate with the same mapping parameters, and thus, may transform each input initial feature vector 420 to the corresponding compact feature vector 422 in the same manner. As a result, the first initial feature vector 420a may be transformed into the first compact feature vector 422a of the first object in the exact same way as the $n^{th}$ initial feature vector 420n being transformed to the $n^{th}$ compact feature vector 422n of the second object. In some embodiments, the compact representation generators 254a . . . 254n and the similarity scorer 256 may implement the model in the form of a neural network including n subnetworks. The compact representation generator 254a may implement a first subnetwork of the neural network. The compact representation generator 254n may implement an $n^{th}$ subnetwork of the neural network. The n subnetworks of the neural network may be identical to each other.

In some embodiments, each compact representation generator 254 may include one or more feature vector processing units 602. In some embodiments, each feature vector processing unit 602 may filter out one or more vector elements corresponding to one or more modality features from the input feature vector to generate the output feature vector. For example, the feature vector processing unit 602 may map an input feature vector having a vector length of 1000 to an output feature vector having a vector length of 750 by filtering out 250 vector elements corresponding to one or more modality features. As multiple feature vector processing units 602 are applied to the first initial feature vector 420a, the first number of modality features comprising the first initial feature vector 420a may be continuously reduced to obtain the first compact feature vector 422a of the first object. Similarly, as multiple feature vector processing units 602 are applied to the $n^{th}$ initial feature vector 420n, the second number of modality features comprising the $n^{th}$ initial feature vector 420n may be continuously reduced to obtain the $n^{th}$ compact feature vector 422n of the second object.

Figure 7:
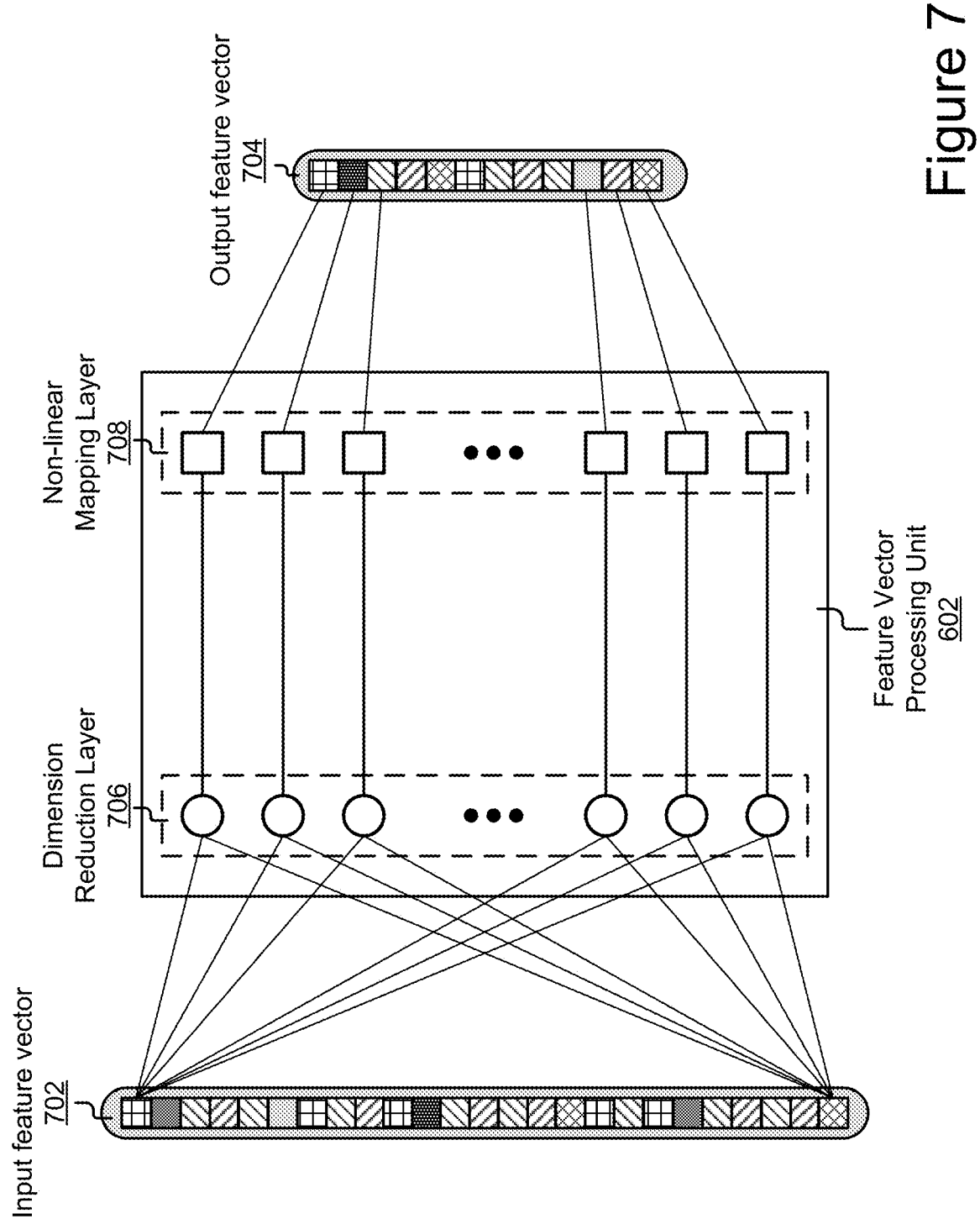
FIG. 7 is a structure diagram of a feature vector processing unit.

FIG. 7 illustrates a structure diagram 700 of a feature vector processing unit 602. As depicted, the feature vector processing unit 602 may include a dimension reduction layer 706 and a non-linear mapping layer 708 for mapping the input feature vector 702 to the output feature vector 704. Referring back to FIG. 6, in block 604, the dimension reduction layer 706 may reduce the number of features in the input feature vector 702. In particular, the dimension reduction layer 706 may aggregate all vector elements of the input feature vector 702, and map the input feature vector 702 from the input vector space to a vector space having lower dimension. As discussed elsewhere herein, in some embodiments, the compact representation generator 254 including the feature vector processing unit 602 may implement a subnetwork of the neural network. In these embodiments, the dimension reduction layer 706 and the non-linear mapping layer 708 may include a plurality of neurons. The number of neurons included in the dimension reduction layer 706 may be significantly lower than the vector length of the input feature vector 702 (e.g., 800 neurons v. 1200 vector elements) to perform the dimension reduction mapping.

In some embodiment, the dimension reduction layer 706 may perform the dimension reduction mapping for linear vector elements included in the input feature vector 702. The output of the dimension reduction layer 706 may then be input into the non-linear mapping layer 708. In block 606, the non-linear mapping layer 708 may perform the dimension reduction mapping for non-linear vector elements included in the input feature vector 702. Thus, the dimension reduction layer 706 and the non-linear mapping layer 708 in combination may map the input feature vector 702 to the output feature vector 704 that has the lower feature dimension (e.g., smaller vector length) than the input feature vector 702. In some embodiments, the dimension reduction layer 706 and the non-linear mapping layer 708 may be incorporated into one layer capable of mapping both linear vector elements and non-linear vector elements included in the input feature vector 702.

In some embodiments, the dimension reduction layer 706 and the non-linear mapping layer 708 may use mapping parameters to perform the dimension reduction mapping. In some embodiments, the mapping parameters may indicate the determinative weight of various modality features in discriminatively representing the detected object. In some embodiments, the dimension reduction layer 706 and the non-linear mapping layer 708 may determine the modality features having the determinative weight satisfies a predetermined determinative threshold (e.g., less than 20%) and filter out the vector elements corresponding to these modality features from the input feature vector 702 to generate the output feature vector 704. In some embodiments, the dimension reduction layer 706 and the non-linear mapping layer 708 may determine a predetermined number of modality features having the lowest determinative weight (e.g., 200 modality features) and filter out the vector elements corresponding to these modality features from the input feature vector 702 to generate the output feature vector 704.

As discussed elsewhere herein, as the first initial feature vector 420a is subjected to multiple feature vector processing units 602 of the compact representation generator 254a, the first initial feature vector 420a may be mapped to the first compact feature vector 422a of the first object. As the $n^{th}$ initial feature vector 420n is subjected to multiple feature vector processing units 602 of the compact representation generator 254n, the $n^{th}$ initial feature vector 420n may be mapped to the $n^{th}$ compact feature vector 422n of the second object. In block 608, the similarity scorer 256 may perform the regression to compute the similarity score between the first compact representation 422a of the first object in the first image and the $n^{th}$ compact representation 422n of the second object in the second image. In particular, the similarity scorer 256 may compute the similarity score between the first compact feature vector 422a of the first object and the $n^{th}$ compact feature vector 422n of the second object. For example, the similarity scorer 256 may compute the similarity score indicating the level of similarity between the first compact feature vector 422a of the first object and the $n^{th}$ compact feature vector 422n of the second object to be 70%.

In block 610, the discriminator 258 may determine whether the first object in the first image and the second object in the second image describe the same object based on the similarity score. For example, the discriminator 258 may determine that the similarity score between the first compact feature vector 422a of the first object and the $n^{th}$ compact feature vector 422n of the second object (e.g., 70%) satisfies a predetermined score threshold (e.g., more than 50%). Therefore, the discriminator 258 may determine that the first object in the first image and the second object in the second image represent the same object.

In some embodiments, the similarity scorer 256 may also compute the feedback difference between the similarity score and the predetermined target output. In the above example, assuming that the predetermined target output="1," indicating that the first object in the first image and the second object in the second image are actually the same (the actual level of similarity=100%). In this example, the similarity score computed using the first compact feature vector 422a of the first object and the $n^{th}$ compact feature vector 422n of the second object=70%. The similarity scorer 256 may compare the similarity score to the predetermined target output, and therefore determine the feedback difference between the similarity score and the predetermined target output to be 30%. In some embodiments, the similarity scorer 256 may provide the feedback difference between the similarity score and the predetermined target output to the compact representation generators 254a . . . 254n for training the model.

In some embodiments, the compact representation generator 254 may identify a subset of modality features of the first object and the second object as being more determinative than the other modality features of the first object and the second object based on the comparison of the similarity score to the predetermined target output. In particular, the compact representation generators 254a . . . 254n may receive the feedback difference between the similarity score and the predetermined target output from the similarity scorer 256. The compact representation generator 254a . . . 254n may identify the subset of modality features from the first initial representation 420a of the first object, . . . , the $n^{th}$ initial feature vector 420n of the second object as being more determinative than the other modality features from the first initial representation 420a of the first object, . . . , the $n^{th}$ initial feature vector 420n of the second object based on the feedback difference. In some embodiments, the feedback difference may be back-propagated to one or more compact representation generators 254. In some embodiments, the feedback difference computed using the first compact feature vector 422a generated by the compact representation generator 254a and the $n^{th}$ compact feature vector 422n generated by the compact representation generator 254n may be used to train other compact representation generators 254.

In the above example, assuming that the first object in the first image and the second object in the second image represent the same car parking at the curb in the shade. In this example, the texture of vehicle parts and the color of the car are not clearly depicted in the first image and the second image because of the shade. As discussed above, the similarity score between the first compact feature vector 422a of the first object and the $n^{th}$ compact feature vector 422n of the second object is 70%, rather than 100% as indicated by the predetermined target output. Because of the feedback difference of 30% between the similarity score and the predetermined target output, the compact representation generator 254 may determine that other modality features (e.g., the context features, the viewpoint features, etc.) may be more determinative than the texture features and the color features (and thus, more efficient and distinguishable in representing the detected objects) if the initial feature representations of the detected objects includes the texture features and the color features within these particular ranges of feature values.

In some embodiments, the compact representation generators 254a . . . 254n may adjust their parameters (e.g., the mapping parameters) based on the identified subset of modality features to train the model. In some embodiments, the mapping parameters of different compact representation generators 254a . . . 254n may be adjusted in the same manner, and therefore have the same parameter values. In the above example, the compact representation generators 254a . . . 254n may adjust the mapping parameters to decrease the determinative weights of the texture features and the color features, and increase the determinative weights of other modality features (e.g., the context features, the viewpoint features, etc.) in the initial feature vectors of the detected objects. As a result, when the compact representation generators 254 process similar initial feature vectors 420 (e.g., the initial feature vectors 420 having the texture features and/or the color features of approximately the same feature values), the texture features and/or the color features are likely filtered out from the initial feature vectors 420 to generate the corresponding compact feature vectors 422 of the detected objects.

The implementation described above is advantageous for processing object similarity especially in vehicular context. As the model implemented by the compact representation generators 254 is subjected to multiple training cycles with multiple images, the compact representation generators 254 may learn to only include in the compact feature vectors 422 the modality features that are discriminative in representing the detected objects in each particular scenario, and thus most useful for the purpose of determining the object similarity. This implementation is also advantageous because the modality features included in the compact feature vectors 422 are selectively determined from the complete set of modality features included in the initial feature vectors 420. Therefore, all potential modality features are considered but only determinative modality features are preserved to form the compact feature vectors 422. Thus, the data amount required for representing the detected objects may be significantly reduced from the data size of the initial feature vectors 420 (e.g., about 30 kB) to the data size of the compact feature vectors 422 (e.g., less than 100 bytes) without affecting the accuracy of the object similarity determination. With more than 99% of the data amount being reduced, the compact feature vectors 422 can be efficiently transmitted over vehicular networks.

In some embodiments, the training process of the model may also include the similarity scorer 256 learning to generate accurate similarity score. In some embodiments, the similarity scorer 256 may adjust its parameters (e.g., the scoring parameters) based on the feedback difference between the similarity score and the predetermined target output. In some embodiments, the scoring parameters may indicate the scoring weights of various modality features in computing the similarity score between the first compact feature vector 422a of the first object and the $n^{th}$ compact feature vector 422n of the second object. For example, the similarity scorer 256 may slightly increase the scoring weight of the context features while keeping the scoring weight of the viewpoint features unchanged to determine the optimal scoring weight of each modality feature that minimizes the feedback difference.

In some embodiments, the compact representation generators 254 and/or the similarity scorer 256 may determine whether the parameters of the representation learning model that they implement (e.g., the mapping parameters, the scoring parameters, etc.) are sufficiently adjusted. In some embodiments, the similarity scorer 256 may determine whether the feedback difference between the similarity score and the predetermined target output satisfies a predetermined difference threshold. Responsive to determining that the feedback difference between the similarity score and the predetermined target output satisfies the predetermined difference threshold, the similarity scorer 256 may determine that the parameters of the model are sufficiently adjusted. In some embodiments, the compact representation generators 254 may determine the number of times the mapping parameters of the compact representation generators 254 are adjusted (e.g., the number of training cycles being performed). The compact representation generators 254 may then determine whether the number of times the mapping parameters of the compact representation generators 254 are adjusted satisfies a predetermined number threshold (e.g., whether the maximal number of training cycles required is reached). Responsive to determining that the number of times the mapping parameters of the compact representation generators 254 are adjusted satisfies the predetermined number threshold, the compact representation generators 254 may determine that the parameters of the model are sufficiently adjusted.

In some embodiments, as the parameters of the model are sufficiently adjusted, the training process of the model is complete. The model is considered as converged and ready for the deployment process with the set of adjusted parameters (e.g., the mapping parameters, the scoring parameters, etc.). In some embodiments, the model implemented by the compact representation generator 254a . . . 254n and the similarity scorer 256 may be deployed in a distributed manner. In particular, as discussed elsewhere herein, each compact representation generator 254a . . . 254n may operate with the same mapping parameters and may be identical to each other. Therefore, responsive to determining that the parameters of the model are sufficiently adjusted, each compact representation generator 254 may be distributed to one vehicle platform 103 for implementation. For example, the compact representation generator 254a may be implemented in the first vehicle platform 103a, . . . , the compact representation generator 254n may be implemented in the $n^{th}$ vehicle platform 103n. In some embodiments, the similarity scorer 256 may be implemented in a computing server (e.g., the server 101) or in any other computing entity of the system 100. Other distributable implementations and centralized implementations of the model are also possible and contemplated.

Referring back to FIG. 4A, in block 414, the discriminator 258 may determine whether the first object in the first image and the second object in the second image describe the same object based on the similarity score. In some embodiments, the discriminator 258 may determine whether the similarity score between the first compact representation 422a of the first object and the $n^{th}$ compact representation 422n of the second object satisfies a predetermined score threshold (e.g., more than 50%). Responsive to determining that the similarity score between the first compact representation 422a of the first object and the $n^{th}$ compact representation 422n of the second object satisfies the predetermined score threshold, the discriminator 258 may determine that the first object in the first image and the second object in the second image represent the same object. In block 416, the association processor 260 may associate the first image and the second image based on the discrimination result. In particular, if the discriminator 258 determines that the first object in the first image and the second object in the second image represent the same object, the association processor 260 may associate the first image with the second image. Therefore, the first image and the second image can be used in combination to analyze the related road scene captured in the first image and the second image. If the discriminator 258 determines that the first object in the first image and the second object in the second image do not represent the same object, the association processor 260 may not associate the first image with the second image.

Figure 4B:
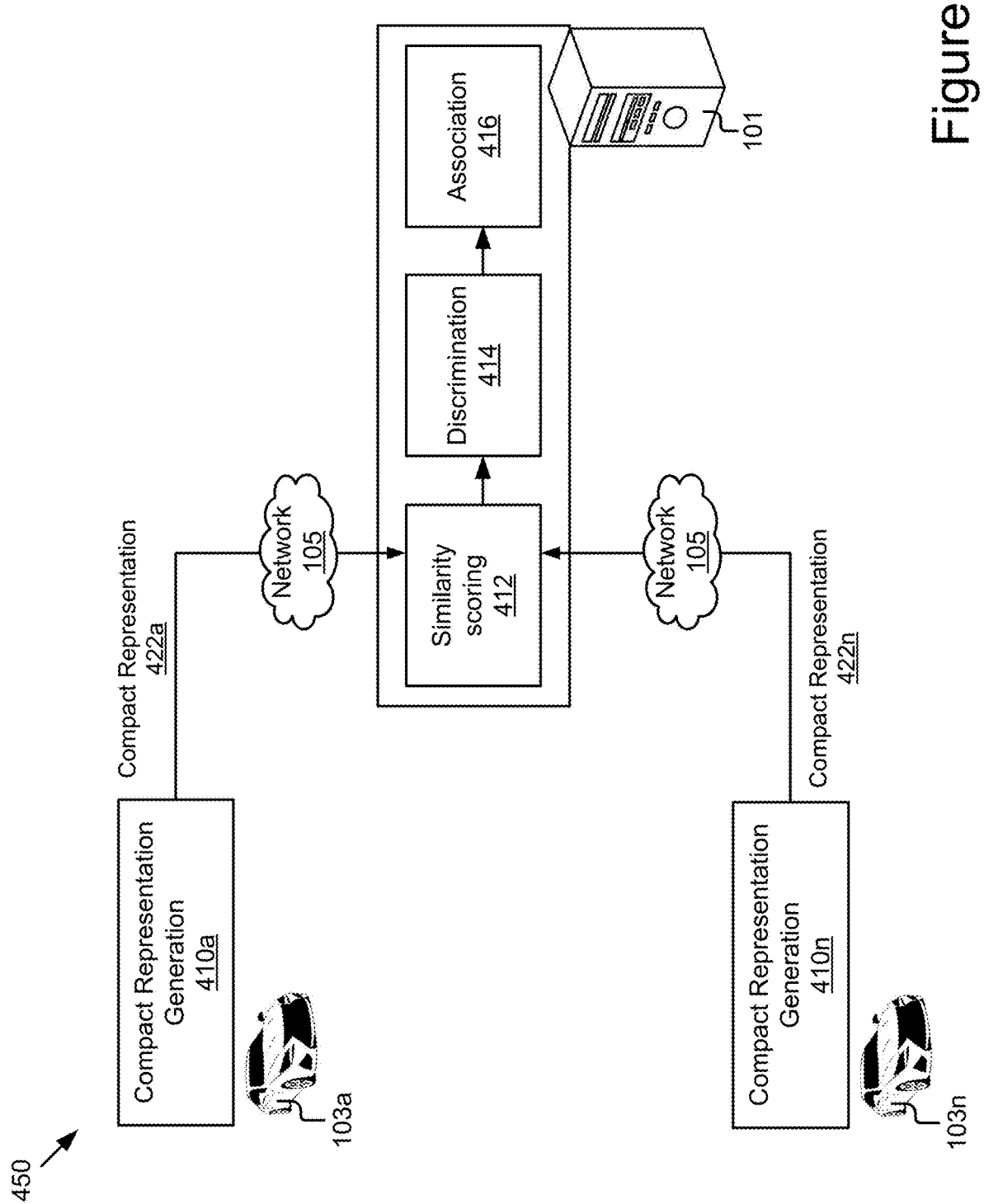
FIG. 4B is a flowchart of an example method for distributable learning of compact representation of detected objects and associating multiple observations from multiple vehicles.

FIG. 4B is a flowchart of an example method 450 for distributable learning of compact representation of detected objects in the captured images and associating multiple captured images from multiple vehicles. As depicted in FIGS. 4A and 4B, in some embodiments, the components of the multi-view observation application 120 for generating the compact representations 422 of the detected objects in the captured images may be implemented in the vehicle platforms 103, while the components of the multi-view observation application 120 for processing object similarity and associating the captured images may be implemented in the server 101 during the deployment process.

In particular, if the multi-view observation application 120 is included in the vehicle platforms 103, the detector 202, the feature extractor 250, the modality processor 252, and the compact representation generator 254 may be enabled, while the similarity scorer 256, the discriminator 258, and the association processor 260 may be disabled. In some embodiments, the detector 202, the feature extractor 250, the modality processor 252, and the compact representation generator 254 may be configured to detect objects in the captured images, extract modality features of the detected objects, processing the modality features to generate the initial representations 420 of the detected objects, and generate the compact representations 422 of the detected objects from the corresponding initial representations 420 of the detected objects. If the multi-view observation application 120 is included in the server 101, the similarity scorer 256, the discriminator 258, and the association processor 260 may be enabled, while the detector 202, the feature extractor 250, the modality processor 252, and the compact representation generator 254 may be disabled. In some embodiments, the similarity scorer 256, the discriminator 258, and the association processor 260 may be configured to compute the similarity score using the compact representations 422 of the detected objects, determine whether the detected objects represent the same object, and associate the captured images including the detected objects accordingly.

As depicted in FIGS. 4A and 4B, in some embodiments, the first vehicle platform 103a may capture a first image including a first object. As discussed above, the first vehicle platform 103a may include the multi-view observation application 120 with the compact representation generator 254a being trained to generate the compact representations of detected objects. In block 410a, the compact representation generator 254a may generate the first compact representation 422a of the first object in the first image. In some embodiments, the first compact representation 422a of the first object may be transmitted to the server 101 via the vehicular network (e.g., the network 105). Similarly, the $n^{th}$ vehicle platform 103n may capture a second image including a second object. As discussed above, the $n^{th}$ vehicle platform 103n may include the multi-view observation application 120 with the compact representation generator 254n being trained to generate the compact representations of detected object. The compact representation generator 254n implemented in the $n^{th}$ vehicle platform 103n may be identical to the compact representation generator 254a implemented in the first vehicle platform 103a, and thus may generate the compact representations of detected objects in the same manner. In block 410n, the compact representation generator 254n may generate the $n^{th}$ compact representation 422n of the second object in the second image. In some embodiments, the n$^{th}$ compact representation 422n of the second object may be transmitted to the server 101 via the vehicular network (e.g., the network 105).

In some embodiments, the first compact representation 422a of the first object and the n$^{th}$ compact representation 422n of the second object may be generated and transmitted in real-time as the first image including the first object and the second image including the second object are captured. In some embodiments, the server 101 may receive the first compact representation 422a of the first object from the first vehicle platform 103a and the n$^{th}$ compact representation 422n of the second object from the n$^{th}$ vehicle platform 103n via the vehicular network (e.g., the network 105). The multi-view observation application 120 included in the server 101 may perform the object similarity processing and image association using the first compact representation 422a of the first object received from the first vehicle platform 103a and the n$^{th}$ compact representation 422n of the second object received from the n$^{th}$ vehicle platform 103n. In particular, in block 412, the similarity scorer 256 may compute the similarity score between the first compact representation 422a of the first object and the n$^{th}$ compact representation 422n of the second object. In block 414, the discriminator 258 may determine whether the first object in the first image and the second object in the second image is the same object based on the similarity score. In block 416, the association processor 260 may associate the first image with the second image based on the discrimination result. For example, if the discriminator 258 determines that the first object in the first image and the second object in the second image is the same object, the association processor 260 may associate the first image with the second image. In some embodiments, such image association may be performed in real-time.

In some embodiments, the first image captured by the first vehicle platform 103a may include a plurality of first objects and the second image captured by the n$^{th}$ vehicle platform 103n may include a plurality of second objects. In these embodiments, one or more first objects in the first image may be matched to one or more second objects in the second image so that the total similarity scores of these matching pairs are maximized. In particular, the similarity scorer 256 may compute the similarity score between each first object in the first image and each second object in the second image. The pairs of (first object, second object) having the similarity score that does not satisfy the predetermined score threshold (e.g., more than 50%) may be filtered out. The discriminator 258 may then match each first object in the first image with a second object in the second image that have the highest similarity score with the first object. If any two first objects in the first image are matched with the same second object in the second image, one of the two first objects may be matched with another second object in the second image such that the total similarity score of the corresponding matching pairs are maximized.

As an example, the first image captured by the first vehicle platform 103a from the first perspective may include 3 first objects (e.g., a car $A_1$, a car $A_2$, and a construction vehicle $A_3$). The second image captured by the n$^{th}$ vehicle platform 103n from the second perspective may include 4 second objects (e.g., a car $B_1$, a car $B_2$, a construction vehicle $B_3$, and a pedestrian $B_4$). In this example, the car $A_1$ in the first image may have the highest similarity score with the car $B_1$ in the second image (e.g., the similarity score of (car $A_1$, car $B_1$)=70%) and the second highest similarity score with the car $B_2$ in the second image (e.g., the similarity score of (car $A_1$, car $B_2$)=63%). The car $A_2$ in the first image may have the highest similarity score with the car $B_1$ in the second image (e.g., the similarity score of (car $A_2$, car $B_1$)=85%) and the second highest similarity score with the car $B_2$ in the second image (e.g., the similarity score of (car $A_2$, car $B_2$)=65%). In this example, the discriminator 258 may determine that the total similarity score of 2 matching pairs (car $A_1$, car $B_2$) and (car $A_2$, car $B_1$)=148% while the total similarity score of 2 matching pairs (car $A_1$, car $B_1$) and (car $A_2$, car $B_2$)=135%. Therefore, the discriminator 258 may match the car $A_1$ in the first image with the car $B_2$ in the second image, and match the car $A_2$ in the first image with the car $B_1$ in the second image because this combination generates the maximal total similarity score.

Figure 9A:
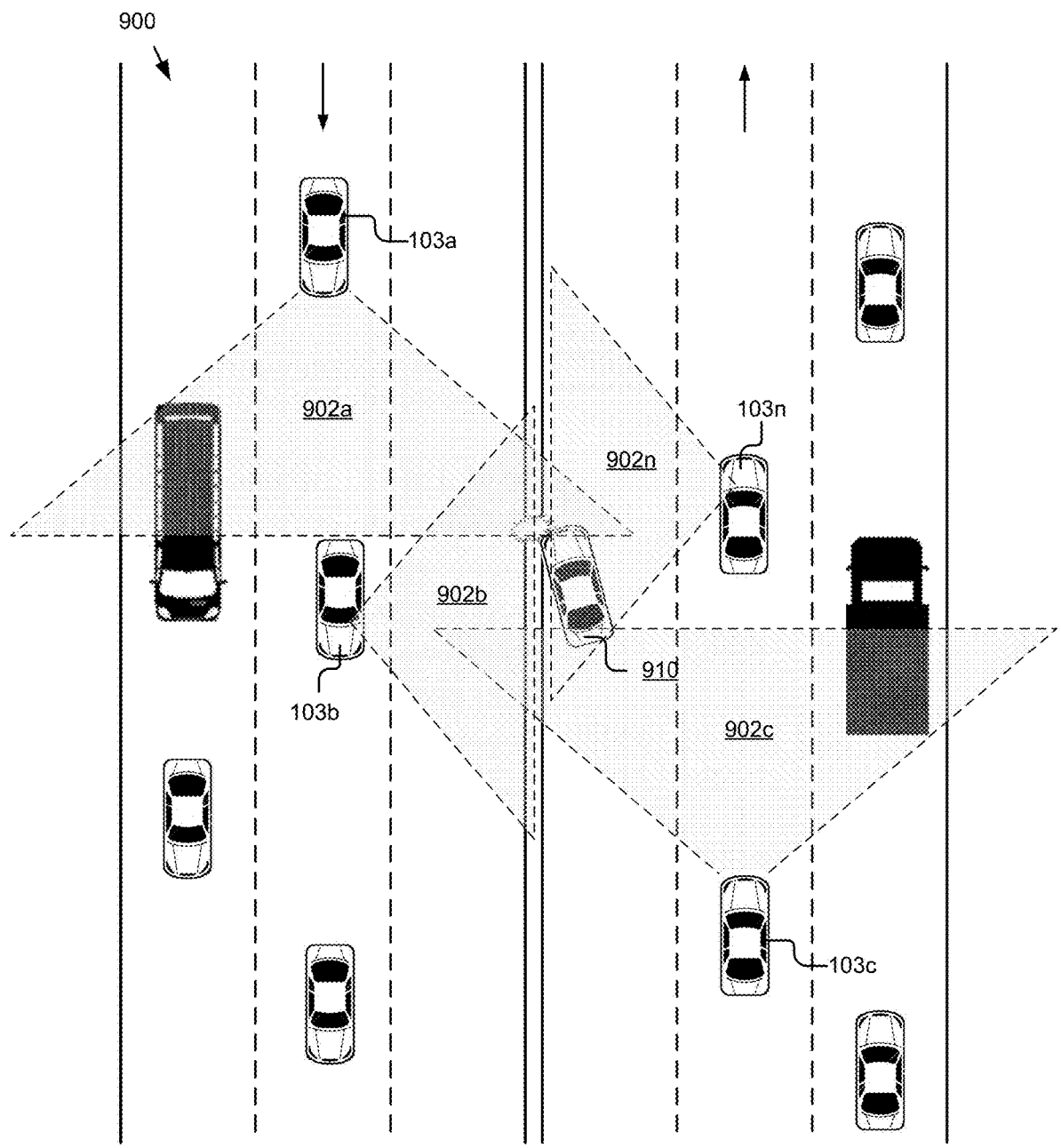
FIG. 9A illustrates an example road segment with a traffic situation.

FIG. 9A illustrates a traffic situation of accident scene on the road segment 900. As depicted, the vehicle platforms 103 located in the road segment 900 may capture images of the road scene using their image sensors 113. The image sensors 113 may be provided at different positions on the vehicle platforms 103 (e.g., at the front side, rear side, right side, and/or left side) and may capture images of the road scene within their corresponding sensor range 902. As the vehicle platforms 103 are located in the same road segment 900, the images captured by their image sensors likely include the same objects present in the road scene but captured from different perspectives. For example, as shown, the images captured by the vehicle platform 103a . . . 103n may all include the crashed vehicle 910 as observed from different perspectives.

Figure 9B:
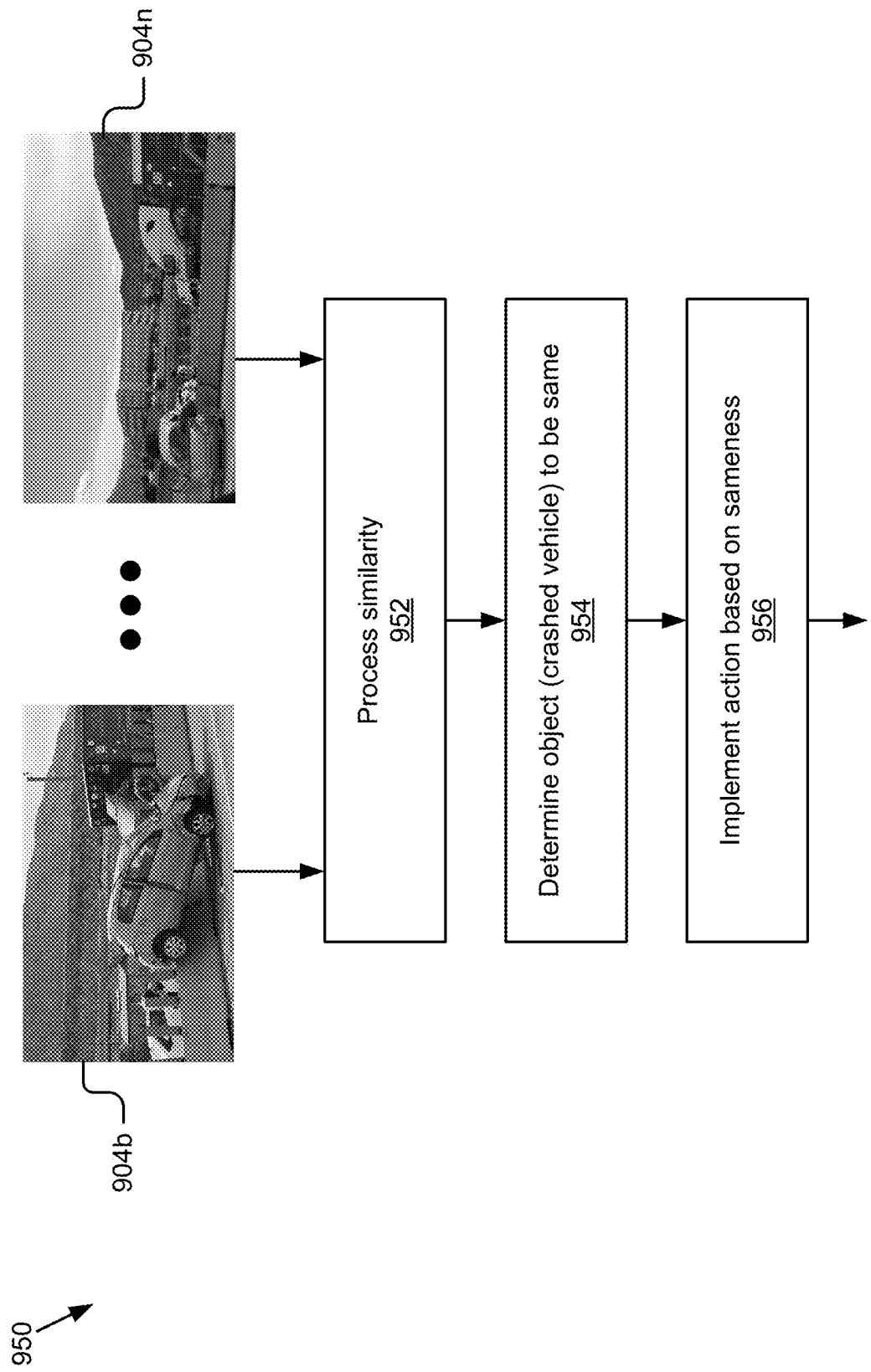
FIG. 9B is a flowchart of an example method for associating observations from multiple vehicles located in the road segment.

FIG. 9B is a flowchart of an example method 950 for associating observations from multiple vehicle platforms located in the road segment. In some embodiments, the multi-view observation application 120 may receive the captured images from multiple vehicle platforms 103. For example, the multi-view observation application 120 may receive the images 904 of the road segment 900 from the vehicle platforms 103a . . . 103n. As depicted in FIG. 9A, the images 904 may be captured from different perspectives. In block 952, the multi-view observation application 120 may process the similarity of the captured images. In block 954, the multi-view observation application 120 may determine whether the detected objects in the capture images are the same. As discussed elsewhere herein, the multi-view observation application 120 may generate the compact feature representations of the detected objects in the captured images, and determine whether the detected objects in different captured images represent the same objects using these compact feature representations. In the above example, the multi-view observation application 120 may generate the compact feature representations of the crashed vehicles included in the images 904 captured by the vehicle platforms 103a . . . 103n. The multi-view observation application 120 may compute the similarity score between the compact feature representations of the crashed vehicles depicted in the images 904. Accordingly, the multi-view observation application 120 may determine that the crashed vehicles depicted in the images 904 actually describe the same crashed vehicle 910.

In block 956, the multi-view observation application 120 may implement one or more actions based on the sameness of the detected objects. In the above example, as the images 904 captured by the vehicle platforms 103a . . . 103n include the same crashed vehicle 910, the images 904 may be associated with each other and may be processed in combination to obtain a comprehensive understanding of the traffic situation. For example, the images 904 may be subjected to visual processing to determine the accurate location (e.g., GPS coordinates) of the crashed vehicle 910, generate a 3D model of the accident scene, monitor the coverage area of the accident scene over time, etc. Other actions are possible and contemplated.

In the above description, for purposes of explanation, numerous specific details are set forth in order to provide a thorough understanding of the present disclosure. However, it should be understood that the technology described herein could be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web-Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A method comprising:
   receiving two or more images captured by two or more vehicle platform sensors of two, or more different vehicle platforms proximate to a traffic situation;
   extracting a first set of multi-modal features from first objects in a first image of the two or more images, the first image associated with a first vehicle platform of the two or more different vehicle platforms;
   extracting a second set of multi-modal features from second objects in a second image of the two or more images, the second image associated with a second vehicle platform of the two or more different vehicle platforms;
   processing the first set of multi-modal features and the second set of multi-modal features using separate machine learning logic to produce a first output and a second output, respectively;
   generating a similarity score quantifying a difference between the first set of multi-modal features and the second set of multi-modal features using the first output and the second output; and
   associating, using the similarity score, a first observation of the traffic situation reflected by the first image associated with the first vehicle platform and a second observation of the traffic situation reflected by the second image associated with the second vehicle platform.

2. The method of claim 1, further comprising:
   normalizing the first set of multi-modal features; and
   normalizing the second set of multi-modal features, wherein
      combining the first set of multi-modal features includes combining the first set of normalized multi-modal features into a first multi-modal initial feature vector; and
      combining the second set of multi-modal features includes combining the second set of normalized multi-modal features into a second multi-modal initial feature vector.

3. The method of claim 1, further comprising:
   detecting the first objects in the first image of the two or more images; and
   detecting the second objects in the second image of the two or more images.

4. The method of claim 1, further comprising:
   determining a first set of objects from the first objects of the first image to be driving-related; and
   determining a second set of objects from the second objects of the second image to be driving related.

5. The method of claim 1, further comprising:
   combining the first set of multi-modal features into a first multi-modal feature vector; and
   combining the second set of multi-modal features into a second multi-modal feature vector, wherein processing the first set of multi-modal features and the second set of multi-modal features includes processing the first multi-modal feature vector into a first compact feature vector and processing the second multi-modal feature vector into a second compact feature vector.

6. The method of claim 1, wherein:
   the first set of multi-modal features includes a texture feature, a color feature, a context feature, and a viewpoint feature of one or more of the first objects; and
   the second set of multi-modal features includes a texture feature, a color feature, a context feature, and a viewpoint feature of one or more of the second objects.

7. The method of claim 1, wherein a predetermined target output indicates whether a first object in the first image and a second object in the second image represent a same object.

8. The method of claim 1, wherein the separate machine learning logic includes a first machine learning logic and a second machine learning logic, the first machine learning logic being a first subnetwork of a neural network and the second machine learning logic being a second subnetwork of the neural network.

9. The method of claim 1, further comprising:
   outputting information via an output device of the first vehicle platform based on the associating of the first observation of the traffic situation and the second observation on the traffic situation.

10. The method of claim 1, further comprising:
    updating, based on the associating of the first observation of the traffic situation and the second observation on the traffic situation, dynamic mapping data reflecting a dynamic state of a roadway associated with the traffic situation;
    determining a location of another vehicle platform approaching the traffic situation based on the dynamic mapping data; and
    sending notification data to the other vehicle platform approaching the traffic situation for output by an output device of the other vehicle platform.

11. A system comprising:
    a first vehicle platform including:
       a first sensor having a first perspective directed toward an external environment external to the first vehicle platform, the first sensor capturing first sensor data reflecting first objects included in the external environment, and
       a first communication unit for receiving second sensor data from a second vehicle platform, the second sensor data reflecting second objects included in the external environment from a second perspective; and
    one or more computing devices that perform operations comprising:
       extracting a first set of multi-modal features from the first objects in the first sensor data;
       extracting a second set of multi-modal features from the second objects in the second sensor data;
       processing the first set of multi-modal features and the second set of multi-modal features using separate machine learning logic to produce a first output and a second output, respectively;
       generating a similarity score quantifying a difference between the first set of multi-modal features and the second set of multi-modal features using the first output and the second output; and associating, using the similarity score, the first perspective and the second perspective.

12. The system of claim 11, wherein the second vehicle platform includes:
a second sensor having the second perspective directed toward the external environment which is also external to the second vehicle platform, the second sensor capturing the second sensor data reflecting the first objects included in the external environment, and
a second communication unit for sending the second sensor data from the second vehicle platform to the first vehicle platform.

13. The system of claim 11, further comprising:
a hardware server embodied by at least one of the one or more computing devices, the hardware server adapted to train a machine learning model comprising the separate machine learning logic based on the similarity score, wherein a first instance of the machine learning model is installed on the first vehicle platform and a second instance of the machine learning model is installed on the second vehicle platform.

14. A system comprising:
one or more processors including logic executable to perform operations comprising:
receiving two or more images captured by two or more vehicle platform sensors of two or more different vehicle platforms proximate to a traffic situation;
extracting a first set of multi-modal features from first objects in a first image of the two or more images, the first image associated with a first vehicle platform of the two or more different vehicle platforms;
extracting a second set of multi-modal features from second objects in a second image of the two or more images, the second image associated with a second vehicle platform of the two or more different vehicle platforms;
processing the first set of multi-modal features and the second set of multi-modal features using separate machine learning logic to produce a first output and a second output, respectively;
generating a similarity score quantifying a difference between the first set of multi-modal features and the second set of multi-modal features using the first output and the second output; and
associating, using the similarity score, a first observation of the traffic situation reflected by the first image associated with the first vehicle platform and a second observation of the traffic situation reflected by the second image associated with the second vehicle platform.

15. The system of claim 14, further comprising:
normalizing the first set of multi-modal features; and
normalizing the second set of multi-modal features, wherein
combining the first set of multi-modal features includes combining the first set of normalized multi-modal features into a first multi-modal initial feature vector; and combining the second set of multi-modal features includes combining the second set of normalized multi-modal features into a second multi-modal initial feature vector.

16. The system of claim 14, further comprising:
detecting the first objects in the first image of the two or more images; and
detecting the second objects in the second image of the two or more images.

17. The system of claim 16, further comprising:
determining a first set of objects from the first objects of the first image to be driving-related; and
determining a second set of objects from the second objects of the second image to be driving related.

18. The system of claim 14, further comprising:
combining the first set of multi-modal features into a first multi-modal feature vector; and
combining the second set of multi-modal features into a second multi-modal feature vector, wherein processing the first set of multi-modal features and the second set of multi-modal features includes processing the first multi-modal feature vector into a first compact feature vector and processing the second multi-modal feature vector into a second compact feature vector.

19. The system of claim 14, wherein:
the first set of multi-modal features includes a texture feature, a color feature, a context feature, and a viewpoint feature of one or more of the first objects; and
the second set of multi-modal features includes a texture feature, a color feature, a context feature, and a viewpoint feature of one or more of the second objects.

20. The system of claim 14, wherein a predetermined target output indicates whether a first object in the first image and a second object in the second image represent a same object.

21. The system of claim 14, wherein the separate machine learning logic includes a first machine learning logic and a second machine learning logic, the first machine learning logic being a first subnetwork of a neural network and the second machine learning logic being a second subnetwork of the neural network.

22. The system of claim 14, further comprising:
outputting information via an output device of the first vehicle platform based on the associating of the first observation of the traffic situation and the second observation on the traffic situation.

23. The system of claim 14, further comprising:
updating, based on the associating of the first observation of the traffic situation and the second observation of the traffic situation, dynamic mapping data reflecting a dynamic state of a roadway associated with the traffic situation;
determining a location of another vehicle platform approaching the traffic situation based on the dynamic mapping data; and
sending notification data to the other vehicle platform approaching the traffic situation for output by an output device of the other vehicle platform.

* * * * *